(12) United States Patent
Yu et al.

(10) Patent No.: US 7,979,257 B2
(45) Date of Patent: Jul. 12, 2011

(54) APPARATUS AND METHODS FOR PERFORMING PROCESS SIMULATION USING A HYBRID MODEL

(75) Inventors: Huagang Yu, Bulleen (AU); Peter Kennedy, Ithaca, NY (US)

(73) Assignee: Moldflow Netherlands Limited, County Cork (IE)

( * ) Notice: Subject to any disclaimer, the term of this patent is extended or adjusted under 35 U.S.C. 154(b) by 489 days.

(21) Appl. No.: 11/961,916

(22) Filed: Dec. 20, 2007

(65) Prior Publication Data
US 2008/0221845 A1 Sep. 11, 2008

Related U.S. Application Data

(63) Continuation of application No. 10/771,739, filed on Feb. 4, 2004, now abandoned.

(60) Provisional application No. 60/445,182, filed on Feb. 5, 2003.

(51) Int. Cl.
*G06G 7/50* (2006.01)

(52) U.S. Cl. .......................................................... 703/9

(58) Field of Classification Search ........................ 703/9
See application file for complete search history.

(56) References Cited

U.S. PATENT DOCUMENTS

| | | | |
|---|---|---|---|
| 3,627,553 A | 12/1971 | Clark et al. | |
| 3,977,255 A | 8/1976 | Groleau et al. | |
| 4,387,655 A | 6/1983 | Chaiken | |
| 4,504,920 A | 3/1985 | Mickowski | |
| 4,534,003 A | 8/1985 | Manzione | |
| 4,641,270 A | 2/1987 | Lalloz et al. | |
| 4,676,664 A | 6/1987 | Anderson et al. | |
| 4,868,751 A | 9/1989 | Dogru et al. | |
| 4,989,166 A | 1/1991 | Akasaka et al. | |
| 5,031,108 A | 7/1991 | Fujita et al. | |
| 5,031,127 A | 7/1991 | Fujita et al. | |
| 5,035,598 A | 7/1991 | Fujita et al. | |
| 5,072,782 A | 12/1991 | Namba et al. | |

(Continued)

FOREIGN PATENT DOCUMENTS

AU 27152/95 2/1996
(Continued)

OTHER PUBLICATIONS

Yu et al., A hybrid 3d/2d finite element technique for polymer processing operations, Polymer Engineering and Science, Jan. 1999. (The reference from the search report is in parent application).*

(Continued)

*Primary Examiner* — Hugh Jones
(74) *Attorney, Agent, or Firm* — Fish & Richardson P.C.

(57) ABSTRACT

The invention provides an apparatus and methods for performing process simulation and structural analysis using a hybrid model. For example, a method of the invention automatically defines a hybrid solution domain by dividing a representation of a plastic component or mold cavity into two portions—a portion in which a simplified analysis may be conducted, and a portion in which a more complex analysis is required. The method may use as input any form of CAD data that describes the surface of a component or mold. Furthermore, the invention provides methods for simulating fluid flow within a mold cavity by automatically creating a hybrid solution domain, automatically discretizing the domain, and solving for the distribution of process variables within the solution domain.

18 Claims, 16 Drawing Sheets

U.S. PATENT DOCUMENTS

| | | | |
|---|---|---|---|
| 5,097,431 | A | 3/1992 | Harada et al. |
| 5,097,432 | A | 3/1992 | Harada et al. |
| 5,146,086 | A | 9/1992 | De et al. |
| 5,189,626 | A | 2/1993 | Colburn |
| 5,311,932 | A | 5/1994 | Sen et al. |
| 5,350,547 | A | 9/1994 | Yamaguchi et al. |
| 5,377,119 | A | 12/1994 | Backer et al. |
| 5,408,638 | A | 4/1995 | Sagawa et al. |
| 5,543,093 | A | 8/1996 | Nakamura et al. |
| 5,549,857 | A | 8/1996 | Kamiguchi et al. |
| 5,572,434 | A | 11/1996 | Wang et al. |
| 5,581,468 | A | 12/1996 | White et al. |
| 5,677,846 | A | 10/1997 | Kumashiro |
| 5,700,406 | A | 12/1997 | Menhennett et al. |
| 5,760,779 | A | 6/1998 | Yamashita et al. |
| 5,811,133 | A | 9/1998 | Saito et al. |
| 5,812,402 | A | 9/1998 | Nishiyama et al. |
| 5,835,379 | A | 11/1998 | Nakano |
| 5,989,473 | A | 11/1999 | Haverty |
| 6,021,270 | A | 2/2000 | Hanaki et al. |
| 6,077,472 | A | 6/2000 | Kataoka et al. |
| 6,089,744 | A | 7/2000 | Chen et al. |
| 6,096,088 | A * | 8/2000 | Yu et al. ............... 703/9 |
| 6,161,057 | A | 12/2000 | Nakano |
| 6,180,201 | B1 | 1/2001 | Sandstrom |
| 6,192,327 | B1 | 2/2001 | Nishiyama et al. |
| 6,248,103 | B1 | 6/2001 | Tannenbaum et al. |

FOREIGN PATENT DOCUMENTS

| | | |
|---|---|---|
| AU | 721978 | 7/2000 |
| EP | 0525798 | 2/1993 |
| EP | 0698467 | 2/1996 |
| EP | 0747198 | 12/1996 |
| JP | 4305424 | 10/1992 |
| JP | 4331125 | 11/1992 |
| JP | 7125034 | 5/1995 |
| JP | 8-230007 | 9/1996 |
| JP | 09262887 | 10/1997 |
| JP | 10138312 | 5/1998 |
| JP | 10156885 | 6/1998 |
| JP | 2002219739 | 8/2002 |
| NZ | 337718 | 2/2000 |
| WO | 98/43179 | 10/1998 |
| WO | 01/23163 | 4/2001 |

OTHER PUBLICATIONS

International Search Report for the same invention (the corresponding PCT obtains priority from the same provisional application as does the instant application).*

Advani et al., "The Use of Tensors to Describe and Predict Fiber Orientation in Short Fiber Composites,"J. Rheol., 31 (8):751-784 (1987), 35 pages.

Angelloz et al., "Crystallization of Isotactic Polypropylene Under High Pressure (γ phase)," Macromolecules, 33:4138-4145 (2000), 11 pages.

Avrami, "Kinetics of Phase Change, I. General Theory," J. Chem. Phys., 7:1103-1112 (1939), 12 pages.

Baaijens, "Calculation of Residual Stresses in Injection Molded Products," Rheologica Acta, 30:284-299 (1991), 17 pages.

Batch, "3D Effects in Injection Molding Simulation," ANTEC '94,1:547-553 (1994), 10 pages.

Bathe, "Finite Element Procedures in Engineering Analysis," 407-428 (1982), 25 pages.

Batoz et al., "A Discrete Shear Triangular Nine D.O.F. Element for the Analysis of Thick to Very Thin Plates, "International Journal for Numerical Methods in Engineering , 28:533-560 (1989), 30 pages.

Batoz et al., "Formulation and Evaluation of New Triangular, Quadrilateral, Pentagonal and Hexagonal Discrete Kirchhoff plate/shell Elements," International Journal for Numerical Methods in Engineering, 52:612-630 (2001), 17 pages.

Begehr et al., "Hele-Shaw Type flows in R," Nonlinear Analysis, Theory, Methods & Applications, Great Britain 10 (1):65-66 (1986), 2 pages.

Begehr et al., "Non-Newtonian Hele-Shaw flows in n>2 Dimensions," Nonlinear Analysis, Theory, Methods & Applications, Great Britain, 11(1):17-18 (1987), 2 pages.

Belytschko, "Meshless Methods: An Overview and Recent Developments," Computer Methods in Applied Mechanics and Engineering (Special Issue on Meshless Methods), 139:3-77 (1996), 78 pages.

Bergan et al., "A Triangular Membrane Element with Rotational Degrees of Freedom," Computer Methods in Applied Mechanics and Engineering, 50(1):25-69 (1985), 48 pages Booij, "The Energy Storage in the Rouse Model in an Arbitrary Flow Field," J. Chem. Phys., 80(9.1):4571-4572 (1984), 5 pages.

Brincat et al., "Contraction Pressure Loss; Influence of Temperature and Fibre Reinforcement," Swinburne University of Technology, Moldflow Pty., Ltd., and Sunkyong Industries, Sorrento, Italy (1996), 2 pages.

Brooks et al., :Streamline Upwind/Petrov-Galerkin Formulations for Convection Dominated Flows with Particular Emphasis on the Incompressible Navier-Stokes Equations, Computer Methods in Applied Mechanics and Engineering, 32:199-259 (1982), 64 pages.

Bushman et al., "A Continuum Model for the Dynamics of Flow-Induced Crystallization," J. Polym. Sci.: Part B: Polymer Physics, 34:2393-2407 (1996), 19 pages.

Chaubal et al, "A Closure Approximation of Liquid Crystalline Polymer Models Based on Parametric Density Estimation," J. Rheol., 42(I):177-201 (1998), 26 pages.

Chung et al., "Invariant-Based Optimal Fitting Closure Approximation for the Numerical Prediction of Flow-Induced Fiber Orientation," J. Rheol., 46(I):169-194 (2002), 28 pages.

Coppola et al, "Microrheological Modeling of Flow-Induced Crystallization," Macromolecules, 34:5030-5036 (2001), 8 pages.

Costa et al., "An Adaptation of the Boundary Element Method for Modeling Gas Injection Molding, "Simulation of Materials Processing: Theory, Methods and Application, Rotterdam, The Netherlands, 1113-1118 (1995), 9 pages.

Costa et al., "Gas Injection Molding Simulation by the Boundary Element Method," Swineburne University of Technology and Moldflow Pty. Ltd., Melbourne, Australia (1994), 12 pages.

Daily et al., "Fluid Dynamics," 164-165, 180-185 (1996), 7 pages.

Deanin, "Polymer Structure, Properties and Applications," pp. 162-185; 189-284; and 351-412, 189 pages, (1972).

Deitz, "Optimizing injection-molded parts, " Mechanical Engineering, 118(10):89-90 (1996), 5 pages.

Ding et al., "Finite element simulation for an injection moulding process," International Journal for Numerical Methods for Heat and Fluid Flow, 7(7):751-766 (1997), 17 pages.

Doufas et al., "A Continuum Model for Flow-Induced Crystallization of Polymer Melts," J. Rheol., 43(I):85-109 (1999), 28 pages.

Doufas et al., "Simulation of Melt Spinning Including Flow-Induced Crystallization. Part I. Model Development and Predictions," J. Non-Newtonian Fluid Mech., 92:27-66 (2000), 41 pages.

Doufas et al., "Simulation of Melt Spinning Including Flow-Induced Crystallization. Part II. Quantitative Comparisons with Industrial Spinline Data," J. Non-Newtonian Fluid Mech., 92:81-103 (2000), 24 pages.

Doufas et al., "Simulation of Melt Spinning Including Flow-Induced Crystallization. Part III. Quantitative Comparisons with Pet Spinline Data," J. Rheol., 45(2):403-419 (2001), 20 pages.

Duarte, "A Review of Some Meshless Methods to Solve Partial Differential Equations," TICAM Report 95-06, 1-37, 38 pages.

Eder et al., "Crystallization," H.E.H. Meijer (ed.), Processing of Polymers, vol. 18, Material Science and Technology A Compressive Treatment, Chapter 5, 269-342 (VCH, Weinheim, 1997), 78 pages.

Eder et al., "Crystallization Processes in Quiescent and Moving Polymer Melts Under Heat Transfer Conditions," Progress in Polymer Science, 15:629-714 (1990), 89 pages.

Fan, "Viscosity, First Normal-Stress Coefficient and Molecular Stretching in Dilute Polymer Solutions," J. Non-Newtonian Fluid Mech., 17:125-144 (1985), 21 pages.

Fan et al., "Simulation of Fribre Suspension Flows by the Brownian Configuration Field Method," J. Non-Newtonian Fluid Mech., 84:254-274 (1999), 19 pages.

Fan et al., "Warpage Analysis of Solid Geometry," Society of Plastic Engineers, Inc., ANTEC 2000 Conference Proceedings vol. I—Processing, 723-726 (2000), 7 pages.

Feng et al., "Closure Approximations for the Doi Theory: Which to Use in Simulating Complex Flows of Liquid-Crystalline Polymers?", J. Rheol., 42(5):1095-1119 (1998), 28 pages.

Friedl, "Progress Towards True 3D CAE Analysis for Injection Molding," Moldflow Pty. Ltd. (1996), 5 pages.

Fulchiron et al, "Analysis of the Pressure Effect on the Crystallization Kinetics of Polypropylene: Dilatometric Measurements and Thermal Gradient Modeling," J. Macromolecular Science—Physics 40:297-314 (2001), 21 pages.

"Getting Started with MF/Flow 3D," Release 1.0.0, Moldflow Corporation, pp. I, ii, 1-84 (Sep. 1998), 88 pages.

"Getting Started with Moldflow Plastics Insight," Release 1.0, Moldflow Corporation, pp. I, ii, 1-91 (Jun. 1999), 94 pages.

Guceri, "Finite Difference Solution of Field Problems," Fundamentals of Computer Modeling for Polymer Processing, C. Tucker, ed., Chapter 5, 198-199 (1989), 7 pages.

Guo et al., "Crystallinity and Microstructure in Injection Moldings of Isotactic Polypropylenes, Part I: A New Approach to Modeling and Model Parameters," Polym. Eng. Sci., 39 (10):2096-2114 (1999), 22 pages.

Haschke, "Predicting plastic part life. (The benefits of dynamic analysis, especially with polymers)," (Aug. 23, 2001) at http://www.findarticles.com/cf_dls/m3125/16_73/78362412/p1/article,jhtml?term=, 8 pages.

Hetu et al., "Three-dimensional Finite Element Simulation of Mold Filling Processes," Simulation of Materials Processing: Theory, Methods and Applications, Rotterdam, Netherlands, 1135-1140 (1995), 9 pages.

Hieber et al. "A Finite-Element/Finite-Difference Simulation of the Injection-Molding Filling Process," Journal of Non-Newtonian Fluid Mechanics, 7:1-32 (1980), 33 pages.

Hirt et al., "Volume of Fluid (VOF) Method for the Dynamics of Free Boundaries," Journal of Computational Physics, 39:201-225 (1981), 14 pages.

Hoffman et al., "Kinetics of Crystallization from the Melt and Chain Folding in Polyethylene Fractions Revisited: Theory and Experiment," Polymer 39(13):3151-3212 (1997), 65 pages.

Holman, "Heat Transfer," McGraw-Hill Singapore, 136-139 (1989), 7 pages.

"Installation Guide for Moldflow Plastics Insight," Release 1.0.1, Moldflow Corporation, pp. I, 1-73 (Jun. 1999), 71 pages.

Kennedy, "Flow Analysis of Injection Molds, "German, entire book (1995), 195 pages.

Pouzada et al., "The Use of Morphology Data in the Design of Injection Moulded Flat Products," Antec, Plastics Bridging the Millennium 3:1-5 (1999), 6 pages.

International Search Report for International Application No. PCT/US2004/003063, dated Sep. 6, 2004, 4 pages.

"A Better approach to Midplane Generation Will Keep C-MOLD Users a Step Ahead," C-MOLD News, 8(4) (1996), 2 pages.

CUBIT Mesh Generation Environment vol. I: User's Manual, SAND94-1100, Unlimited Release, 5-194, http://sass2537,sandia.gov/SEACAS/CUBIT/Users/Cubitchapter1.html, Chapters 1-2, 4-5, Appendix B (1994), 192 pages.

International Search Report and Written Opinion of the International Searching Authority for International Application No. PCT/US2004/003063, dated Jan. 7, 2005, 14 pages.

Cignoni et al., "Multiresolution Representation and Visualization of Volume Data," IEEE Transactions on Visualization and Computer Graphics, vol. 3, No. 4, pp. 352-369 (1997), 19 pages.

Shephard et al., "Parallel Automatic Adaptive Analysis," Parallel Computing, vol. 23, pp. 1327-1347, 22 pages.

Yang, H.Q., et al., "Time-Accurate, 3-D Computation of Wire Sweep During Plastic Encapsulation of IC Components," IEEE Electronic Components and Technology Conference, pp. 158-167 (1997), 10 pages.

Painter et al., Fundamentals of Polymer Science an Introductory Text—Second Edition, pp. 237-257; 259-274; 279-305; 321-336; and 395-469.

Kennedy, "Governing Equations for the Filing Phase," Flow Analysis of Injection Molds, Hanser Publishers, Munich Vienna New York, 59-90 (1995), 35 pages.

Kennedy et al., "Plastic Cae Analysis of Solid Geometry," Antec '97, 666-669 (1997) 5 pages.

Kolmogoroff, "On a Statistical Theory of Crystallization of Melts," Bull, Akad. Sci. Ussr, Class Sci., Math. Nat, 1:355-359 (1937), 6 pages.

Koscher et al., "Influence of Shear on Polypropylene Crystallization: Morphology Development and Kinetics," Polymer 43:6931-6942 (2002), 15 pages.

Krieger et al., "A Mechanism for Non-Newtonian Flow in Suspensions of Rigid Spheres," Trans. Soc Rheol., 3:137-152 (1959), 19 pages.

Kulkarni et al., "A Model for the Necking Phenomenon in High-Speed Fiber Spinning Based on Flow-Induced Crystallization," J. Rheol., 42(4):971-994 (1998), 27 pages.

Lauritzen et al., "Theory of Formation of Polymer Crystals with Folded Chains in Dilute Solution," J. Res. Natl. Bur. Stand., 64A(1):73-102 (1960), 33 pages.

Li et al., "Meshfree and Particle Methods and Their Applications," Applied Mechanics Review, 55(1):1-80 (2002), 80 pages.

Masada et al., "A Bimodal Structure of Solution-Crown Isotactic Polypropylene with Orthogonally Crossed Lamellae," J. Polym. Sci. Part B: Polym. Phys., 31:834-852 (1993), 11 pages.

Materials Characterization—Dynamic Mechanical Analysis (DMA), at http://www.calce.umd.edu/general/Facilities/dma.htm, 2 pages, last visited Jul. 7, 2004.

Metzner, "Rheology of Suspensions in Polymer Liquid," J. Rheol., 29(6):739-775 (1985), 4 pages.

"Moldflow Design Principles," Moldflow Corporation, pp. cover, i-vi, 1-55 (1984), 62 pages.

Mod et al., "Simplified Three Dimensional Simulation of Non-Isothermal Filing in Metal Injection Moulding by Finite Element Method," Engineering computations (1996), 12 pages.

Pantani et al., "Relevance of Crystallisation Kinetics in the Simulation of the Injection Molding Process," Int. Polym. Process., 16:61-71 (2001), 5 pages.

Peters, et al., "A Recoverable Strain-Based Model for Flow-Induced Crystallization," Macromol, Symp., 185:277-292 (2002), 19 pages.

Phan-Thien et al., "Macroscopic Modelling of the Evolution of Fibre Orientation During Flow," Flow Induced Alignment in Composite Materials, Chapter 3, 77-111 (1997), 36 pages.

Prandtl, "Essentials of Fluid Dynamics," pp. 150-151 (1967), 3 pages.

Rajupalem et al., "Three-Dimensional Simulation of the Injection Molding Process," Moldflow Pty. Ltd. (1997), 4 pages.

Ray et al., "Incorporation of Viscoelastic Constitutive Equations in the Injection Molding Process," Industrial Research Institute Swinburne and Moldflow Pty. Ltd., Cairns, Australia, (Sep. 1997), 11 pages.

Ray et al., "Three Dimensional Simulation of Viscoelastic Constitutive Equations Using a Segregated Finite Element Scheme," Industrial Research Institute Swinburne and Moldflow Pty. Ltd., Adelaide, Australia (Jul. 1998), 4 pages.

Rezayat et al., "A Thermoviscoelastic Model for Residual Stress in Injection Molded Thermoplastics," Polymer Engineering and Science, 31(6):393-398 (1991), 9 pp.

Rice et al., "An Equal-Order Velocity-Pressure Formulation That Does Not Exhibit Spurious Pressure Modes," Computer Methods in Applied Mechanics and Engineering, 58:135-149 (1986), 9 pages.

Richardson, "Hele Shaw Flows With a Free Boundary Produced by the Injection of Fluid into a Narrow Channel," J. Fluid Mech., 56(4):609-618 (1972), 11 pages.

Saad et al., "GMRES: A Generalized Minimal Residual Algorithm for Solving Nonsymmetric Linear Systems," Siam J. Sci. Stat. Comput., 7(3):856-869 (Jul. 1986), 8 pages.

Slattery, "Momentum, Energy, and Mass Transfer in Coninua," 98-99 (1972), 4 pages.

Sukumar et al., "Natural Neighbor Galerkin Methods," International Journal for Numerical Methods in Engineering, 50:1-27 (2001), 28 pages.

Talwar et al., "Three-dimensional Simulation of Polymer Injection Molding: Verification," Moldflow International Pty. Ltd., Seoul, Korea, 51-58 (Jul. 1998), 7 pages.

Talwar et al., "Three Dimensional Mould Filing Simulation Using a Segregated Finite Element Scheme," Moldflow Inc., Cairns, Australia (Sep. 1997), 12 pages.

Talwar et al., "Three Dimensional Simulation of Plastic Injection Molding," Moldflow Pty. Ltd. (1998), 10 pages.

Talwar et al., "Three Dimensional Simulation of Plastic Injection Molding," Moldflow Pty. Ltd., Michigan (1998), 11 pages.

Tanner et al., "Stresses in Dilute Solutions of Bead-Nonlinear-Spring Macromolecules, Ill Unsteady Flows and Approximate Constitutive Relations," Trans. Soc. Rheol., 19(1):37-65 (1975), 32 pages.

Tanner, "A Suspension Model for Low Shear Rate Polymer Solidification," J. Non-Newtonian Fluid Mech., 102:397-408 (2002), 13 pages.

Vleeshouwers et al., "A Rheological Study of Shear Induced Crystallization," Rheol. Acta, 35(5):391-399 (1996), 12 pages.

Voller et al., "An Algorithm for Analysis of Polymer Filing of Molds," Polymer Engineering and Science, 35 (22):1758-1765 (1995), 9 pages.

Walsh, "Shrinkage and Warpage Prediction for Injection Molded Components," Journal of Reinforced Plastics and Composites, 12:769-777 (1993), 11 pages.

Wang et al., "Numerical Techniques for Free and Moving Boundary Problem," Fundamentals of Computer Modeling for Polymer Processing, C. Tucker, ed., Chapter 8:375-377 (1989), 8 pages.

Wassner et al., "Shear-Induced Crystallization of Polypropylene Melts," Proc. III Congr. Rheol., 1:83-85 (2000), 6 pages.

Wedgewood et al., "From Molecular Models to the Solution of Flow Problems," Ind. Eng. Chem. Res., 27:1313-1320 (1998), 9 pages.

Yokoi et al., "Measurement of Melt Temperature Profiles During filing and Packing Processes Using a New Integrated Thermocouple Sensor," University of Tokyo and Yamaha Motor Co., Ltd. (1992), 8 pages.

Young et al., "Analysis of Resin Injection Molding in Molds with Preplaced Fiber Mats II: Numerical Simulation and Experiments of Mold Filling," Polymer Composites, 12(1):30-38 (1991), 6 pages.

Yu et al., "A Hybrid 3D/2D Finite Element Technique for Polymer Processing Operations," Polymer Engineering and Science, 39(1):44-54 (1999), 14 pages.

Zheng et al., "Predicting Warpage of Injection Molded Fiber-Reinforced Plastics," Journal of Thermoplastic Composite Materials, 9:90-106 (1996), 24 pages.

Zheng et al., "Thermoviscoelastic Simulation of Thermally and Pressure-Induced Stresses in Injection Moulding for the Prediction of Shrinkage and Warpage for Fibre-reinforced Thermoplastics," Journal of Non-Newtonian Fluid Mechanics, 84:159-190 (1999), 33 pages.

Ziabicki, "Crystallization of Polymers in Variable External Conditions. II. Effects of Cooling in the Absence of Stress and Orientation," Colloid Polym. Sci., 274(8):705-716 (1996), 16 pages.

Ziabicki, "The Mechanisms of Neck-Like Deformation in High-Speed Melt Spinning. 2. Effects of Polymer Crystallization," J. Non-Newtonian Fluid Mech., 30:157-168 (1998), 13 pages.

Zuidema, et al., :Development and Validation of a Recoverable Strain-Based Model on Flow-Induced Crystallization of Polymers, Macromol. Theory Simul., 10(5):447-460 (2001), 15 pages.

Guo et al., "Numerical Stimulation of Injection Molding of Semicrystalline Thermoplastics," Antec, Plastic the Lone Star 2001, 1:1-15 (2001), 5 pages.

Guo et al., "On the Prediction of Crystallinity Distribution in Injection Molded Semi-Crystalline Thermoplastics," Antec 2000, Plastic the Magical Solution, 1:1-5 (2000), 6 pages.

Liu, "Isothermal Flow Simulation of Liquid Composite Molding," Composites, Part A 31:1295-1302 (2000), 8 pages.

Muslet, et al., "Computer Simulation of the Film Blowing Process Incorporating Crystallization and Viscoelastic Effects," Antec 3:3241-3245 (2003), 6 pages.

* cited by examiner

FIG. 13
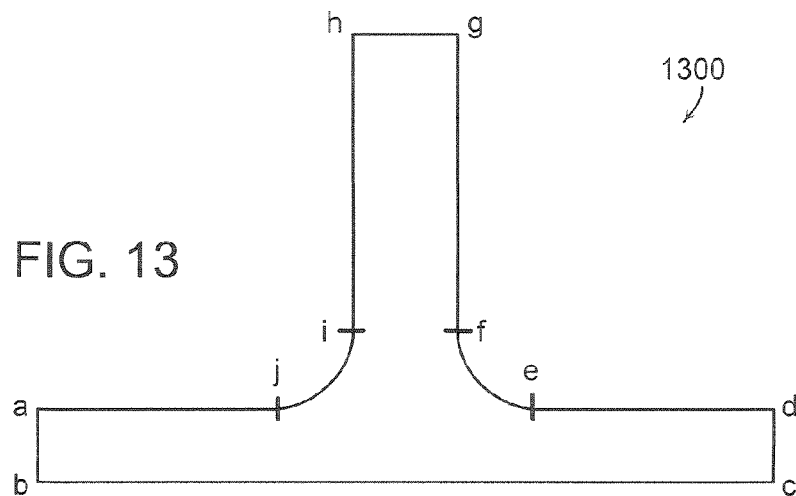
FIG. 14
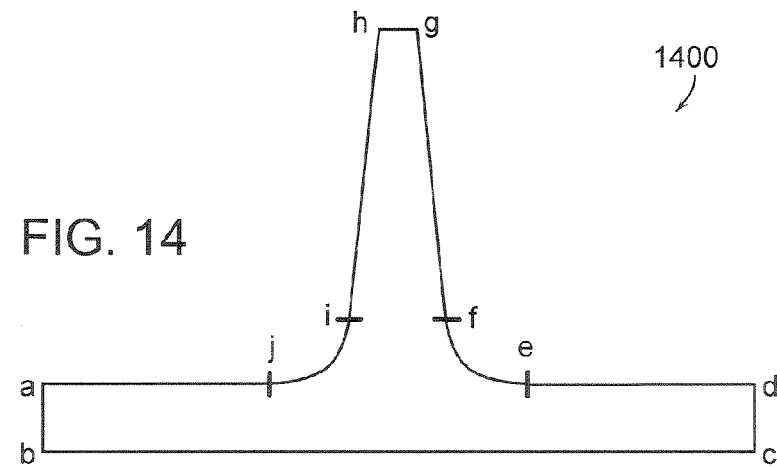
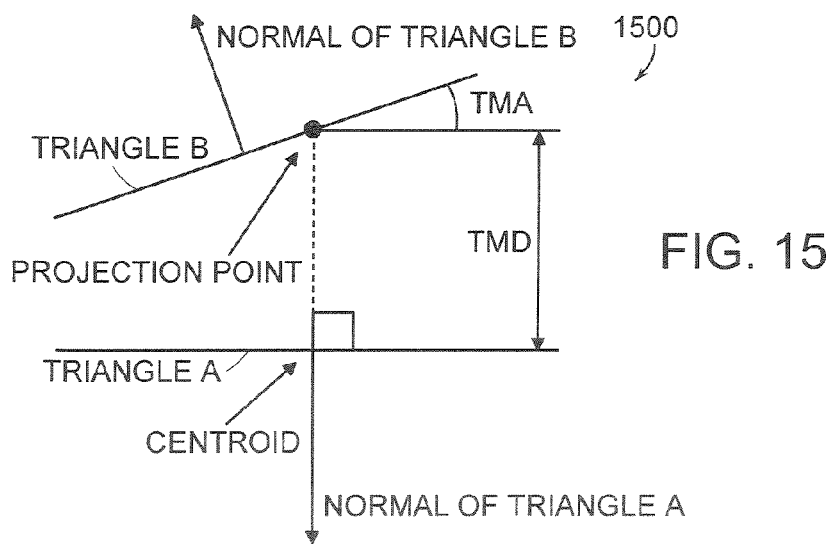
FIG. 15

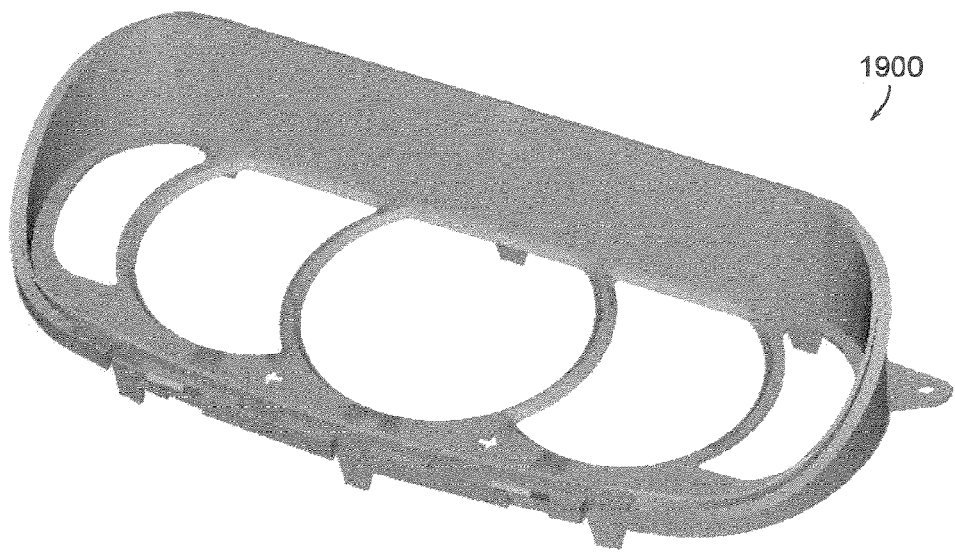
FIG. 19  Scale (200 mm)
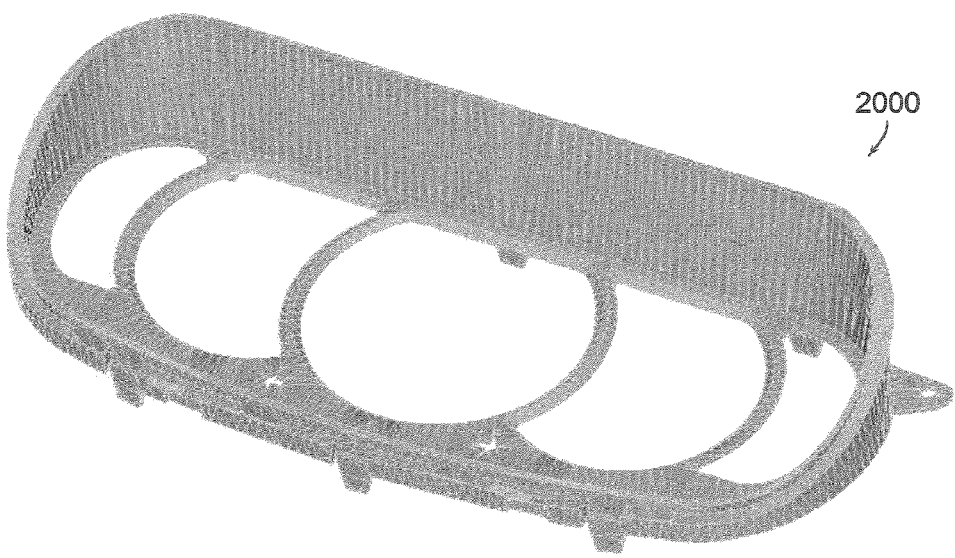
FIG. 20  Scale (200 mm)

Scale (200 mm)

APPARATUS AND METHODS FOR PERFORMING PROCESS SIMULATION USING A HYBRID MODEL

PRIOR APPLICATIONS

The present application is a continuation application of U.S. patent application Ser. No. 10/771,739, filed Feb. 4, 2004, which claims the benefit of U.S. Provisional Patent Application No. 60/445,182, filed Feb. 5, 2003, which are hereby incorporated by reference in their entirety.

FIELD OF THE INVENTION

This invention relates generally to methods of process simulation and analysis. More particularly, the invention relates to the simulation of injection molding using a multi-dimensional model.

BACKGROUND OF THE INVENTION

Manufacturers use process analysis and structural analysis in designing a wide variety of products, including consumer goods, automotive parts, electronic equipment, and medical equipment. It is often advantageous to simulate or otherwise model a manufacturing process to aid in the development of a particular product. A computer simulation of a manufacturing process may allow accurate prediction of how changes in process variables and/or product configuration will affect production. By performing process simulation, a designer can significantly reduce the time and cost involved in developing a product, since computer modeling reduces the need for experimental trial and error. Computer-aided process simulation allows for optimization of process parameters and product configuration during the early design phase, when changes can be implemented more quickly and less expensively.

A manufacturer may also use modeling to predict structural qualities of a manufactured product, such as how the product will react to internal and external forces after it is made. A structural model may be used, for instance, to predict how residual stress in a molded product may result in product warpage. Structural models aid in the design of a product, since many prospective versions of the design can be tested before actual implementation. Time-consuming trial and error associated with producing and testing actual prototypes can be greatly reduced.

There is increasing demand for uniquely designed components. This is particularly true in the field of plastics manufacturing, where uniquely adaptable materials may be formed into a myriad of configurations using processes such as injection molding, compression molding, thermoforming, extrusion, pultrusion, and the like. This is also true in the manufacturing of parts made with fiber-filled materials, composites, and other specialty materials, custom-designed for specialized uses.

Process and structural analysis in these fields poses significant challenges. For example, there is increasing demand for products having complex geometries. In order to properly model a molding process for a product having a complex geometry, the mold must be adequately characterized by the solution domain of the model. Modeling processes involving components with complex geometries requires significantly more computational time and computer resources than modeling processes involving components with simple geometries.

Also, injection-molded plastic is viscoelastic and may have highly temperature-dependent and shear-dependent properties. These complexities further increase computational difficulty of process and structural simulations involving plastic components. Governing equations of adequate generality must be solved over complex domains, taking into account the changing properties of the material being processed. Analytical solutions of these equations over complex domains are generally unavailable; thus, numerical solutions must be sought.

Computer models use numerical methods to approximate the exact solution of governing equations over complex geometries, where analytical solutions are unavailable. A model of an injection molding process may include, for example, a solution domain in the shape of the mold interior, discretized to enable accurate numerical approximation of the solution of the applicable governing equations over the solution domain.

Process models often simulate molds having complicated shapes by using solution domains with simplified geometries, thereby reducing required computation time and computer resources. For example, certain injection molding process simulators use a two-dimensional (2D) solution domain to simplify the geometry of the real, three-dimensional (3D) mold, thereby greatly reducing computational complexity. Many of these simulators use a Hele-Shaw solution approach, where pressure variation and fluid flow in the thickness direction are assumed to be zero. These "2.5D" models are generally beneficial for simulating injection molding of thin-walled components having relatively simple geometries. However, in components that have thick portions or complex geometries, injected material flows in all three directions, and traditional thin-wall assumptions do not apply, making the 2.5D analysis inadequate.

Current 3D models of injection molding processes do not make thin-wall assumptions; they solve constitutive equations over a three-dimensional solution domain. These models are computationally complex, generally requiring significantly greater computer resources and computation times for process simulation than the simpler 2.5D models. Three-dimensional models of injection molding processes generally use a finite element scheme in which the geometry of the mold is simulated with a mesh of 3D elements. The size of the elements, or the discretization, required to accurately model a given process depends on the geometry of the solution domain and the process conditions. The generation of a 3D mesh is not trivial, and there is currently no consistent method of automatically generating a suitable 3D mesh for a given application.

Determining a suitable mesh for a 2.5D, Hele-Shaw-based model is also non-trivial. For example, it is typically necessary to define a surface representing the midplane of a thin-walled component, which is then meshed with triangular or quadrilateral elements to which appropriate thicknesses are ascribed. Thus, there is an added step of determining a midplane surface that must be performed after defining solution domain geometry.

Many manufactured components have at least some portion that is thin-walled or shell-like, that may be amenable to simulation using a 2.5D model. However, many of these components also have one or more thick or complex portions in which the 2.5D assumptions do not hold, thereby making the overall analysis inaccurate. One may use a 3D model to more comprehensively simulate processing of components that have both thick and thin portions. However, the computational complexity of a 3D model is much greater than that of a 2.5D model, thereby increasing the time and computer resources required for analysis.

Additionally, the way a 3D model must be discretized further reduces the efficiency of a 3D process model for a component having thin portions. For example, a typical thin portion of a molded component may have a thickness of about 2 mm, whereas the length of the thin portion may be hundreds of millimeters. During the molding process, there will generally be a large thermal gradient across the thickness of the thin portion, perhaps hundreds of degrees per millimeter, whereas the temperature gradient along the length of the portion (transverse to the thickness) may be extremely low. Conversely, the pressure gradient in the thickness direction will generally be very low, while the pressure gradient in the transverse direction will be very high. The high variability of these properties in at least two directions—temperature across the thickness, and pressure along the length—calls for a very dense mesh with many solution nodes in order to achieve an accurate process simulation, thereby increasing computational complexity. Thus, the time required for accurate 3D simulation of a typical component containing both a thick and a thin portion may be as much as a day or more and may require significant computer resources, due to the fine discretization required.

Hybrid simulations solve simplified flow equations in the relatively thin regions of a given component and more complex flow equations in other regions. Hybrid simulations may reduce the computational complexity associated with full 3D models while improving the simulation accuracy associated with 2.5D models.

A hybrid solution scheme has been proposed in Yu et al., "A Hybrid 3D/2D Finite Element Technique for Polymer Processing Operations," *Polymer Engineering and Science*, Vol. 39, No. 1, 1999. The suggested technique does not account for temperature variation and, thus, does not provide accurate results in non-isothermal systems where material properties vary with temperature, as in most injection molding systems. Example applications of the technique involve relatively simple solution domains that have been pre-divided into "2D" and "3D" portions. Furthermore, there does not appear to be a suggestion of how to adapt the technique for the analysis of more complex parts than the examples shown.

U.S. Pat. No. 6,161,057, issued to Nakano, suggests a simple hybrid solution scheme that solves for process variables in a thick portion and a thin portion of a solution domain. The suggested technique requires simplifying assumptions to calculate pressure and fluid velocity in both the thick and thin portions of the solution domain. For example, the technique requires using Equation 1, below, to calculate fluid velocity in the thick portion of the solution domain:

$$\upsilon_x = \xi \frac{\partial P}{\partial x}, \upsilon_y = \xi \frac{\partial P}{\partial y}, \upsilon_z = \xi \frac{\partial P}{\partial z} \qquad (1)$$

where $\upsilon_x$, $\upsilon_y$, and $\upsilon_z$ are fluid velocity in the x, y, and z directions, respectively; P is pressure; and $\xi$ is flow conductance, which is defined in the Nakano patent as a function of fluid viscosity. The approximation of Equation 1 is more akin to the 2.5D Hele Shaw approximation than full 3D analysis, and Equation 1 does not adequately describe fluid flow in components having thick and/or complex portions, particularly where the thick portion makes up a substantial (non-trivial) part of the component.

Current modeling methods are not robust; they must be adapted for use in different applications depending on the computational complexity involved. Modelers decide which modeling method to use based on the process to be modeled and the geometry of the component to be produced and/or analyzed. Modelers must also determine how to decompose a solution domain into elements depending on the particular component and process being simulated. The decisions made in the process of choosing and developing a model for a given component and/or process may well affect the accuracy of the model output. The process of adapting models to various applications is time-consuming and generally involves significant customization by a highly-skilled technician.

There is a need for a more accurate, more robust, faster, and less costly method of modeling manufacturing processes and performing structural analyses of manufactured components. Current methods require considerable input by a skilled technician and must be customized for the component and/or process being modeled.

SUMMARY OF THE INVENTION

The invention provides an apparatus and methods for using CAD system data to automatically define a hybrid analysis solution domain for a mold cavity and/or molded component. The invention also provides an apparatus and methods for simulating the molding of a manufactured component using a hybrid analysis technique.

The invention overcomes the problems inherent in current hybrid analysis systems, which require intervention by a skilled technician to define a solution domain from CAD system output. The invention provides an automatic, standardized method of defining a hybrid solution domain from CAD system output without requiring expert human intervention. The invention also provides hybrid process analysis techniques that offer improvements upon prior techniques, for example, by accounting for temperature variation and/or complex flow behaviors.

Simulation of fluid flow within a mold cavity generally requires a representation of the mold cavity or molded component. In one aspect, the invention provides a method for simulating fluid flow that automatically divides a representation of a component and/or mold cavity into at least two portions—a portion in which a simplified analysis may be conducted, and a portion in which a more complex analysis is required. The method then includes performing a hybrid analysis—that is, solving a set of simplified governing equations in the simpler portion and a set of more complex governing equations in the complex portion. This reduces the amount of time and memory required to perform a simulation, without compromising accuracy, since the complex set of equations must be solved only where the geometry of the mold or component is complicated. The simplified analysis may be a 2.5D Hele-Shaw analysis, a 2D analysis, a 1D analysis, or any other kind of analysis in which simplifying assumptions can be made with respect to one or more dimensions and/or other variables.

In one embodiment, the invention automatically separates a representation of the geometry of a manufactured component or mold into at least two portions—a portion for 2.5D analysis and a portion for 3D analysis. For example, the invention may use a surface representation of a manufactured component or mold to define a solution domain for hybrid analysis, where the domain is automatically separated into one or more 2.5D-analysis portions and one or more 3D-analysis portions. The 2.5D-analysis portions of the domain each have a substantially invariant or gradually-varying thickness, while the 3D-analysis portions generally have a more complex geometry. For example, the method may identify thin-walled portions of a manufactured component for 2.5D analysis, and separate these from more complex portions—such as corners, the bases of ribs, and intersections of surfaces—for which 3D analysis is performed. In one embodiment, the method also automatically discretizes the 2.5D-analysis portions and the 3D-analysis portions of the solution domain and solves for the distribution of process variables—such as pressure, velocity, and temperature—as functions of time.

The invention provides simulations having greater accuracy than current hybrid schemes. For example, an embodiment of the invention accounts for temperature by incorporating an energy conservation equation in the analysis. Furthermore, the invention allows solution of accurate forms of the mass and momentum conservation equations in the analysis scheme, without requiring simplifying assumptions, as in Equation 1.

Methods of the invention provide faster, less costly simulations than traditional 3D solution techniques, since a full 3D analysis is only performed where necessary. For example, in one embodiment, the invention analyzes as much of the domain as possible—for example, thin, flat portions of the domain—with a simpler, 2.5D scheme, with negligible impact on accuracy.

Methods of the invention are more robust and require less input from skilled technicians than traditional simulation techniques. For example, in one embodiment, the invention uses simple CAD system output to define a surface mesh of a component or mold to be modeled, then automatically divides the mesh into a 2.5D-analysis portion and a 3D-analysis portion via a subsurface matching technique, and automatically discretizes the two portions to form a solution domain in which hybrid analysis is performed. It is not necessary for a technician to decide how to separate a solution domain into 2.5D and 3D analysis portions, since the embodiment performs the separation automatically. In addition to CAD system output, the invention may use any other type of data file conveying a representation of the surface of the component or mold to be modeled. Since the domain is tied to the actual geometry of the component or mold surface, the invention is capable of displaying results directly on the 3D geometry of the component, making interpretation of results more intuitive for a user than schemes which require the creation of a midplane mesh, for example.

In some cases it is useful to allow a user to exert control over the automatically-decomposed solution domain. For example, the automatic decomposition of a given surface domain into a hybrid solution domain may result in regions that are classified as part of the complex portion (i.e. 3D-analysis portion), in which it may be reasonable to perform a simpler analysis (i.e. 2.5-D analysis). For example, a user may wish to tolerate some reduction in accuracy in order to increase analysis speed during the early stages of design, where more accurate analysis may be performed later. In another example, a user may wish to increase simulation accuracy at the expense of the computer time required. Therefore, one embodiment of the invention allows a user to manually re-characterize a given region that has been automatically characterized as falling within either the first portion or the second portion of the solution domain.

The method may also or alternatively allow a user to manually characterize part of the volume to be analyzed as either belonging to the first portion or the second portion of the solution domain prior to the automatic decomposition. This may be useful where the user knows that she/he would like a particular kind of analysis (2.5D, 3D, etc.) in a given region of the volume.

Although descriptions of certain embodiments of the invention include the decomposition of a solution domain into a first and a second portion, it is within the scope of the invention to further decompose the solution domain into a third, fourth, fifth, or additional portions in which different types of analysis are to be performed.

Thus, in one aspect, the invention defines a surface representation from user-provided CAD output; separates the surface representation into two or more portions by analyzing and matching subsurfaces; discretizes the two or more portions; and solves for the distribution of one or more process variables—such as pressure, velocity, and temperature—as a function of time. The process being modeled may be the filling phase and/or packing phase of an injection molding process, for example. The two or more portions may include one or more 2.5D-analysis portions and one or more 3D-analysis portions. The 2.5D-analysis portions of the solution domain may be discretized with wedge elements, and the 3D-analysis portions of the solution domain may be discretized with tetrahedral elements. Dual domain elements of the type discussed in U.S. Pat. No. 6,096,088, to Yu et al., the disclosure of which is incorporated by reference herein in its entirety, may be used instead of wedge elements in the 2.5D-analysis portion. Hexahedral elements may be used instead of tetrahedral elements in the 3D-analysis portion. Other types of elements may be used instead of or in addition to those above. Furthermore, either or both of the 2.5D analysis and the 3D analysis may be performed using a technique other than a finite element technique, such as a boundary element method (BEM), a natural element method (NEM), smooth particle hydrodynamics (SPH), or other meshless scheme.

Interface elements provide a link between the simplified-analysis portions and the complex-analysis portions of a solution domain. In one embodiment, conservation equations and continuity requirements are enforced at the boundary between 2.5D-analysis portions and 3D-analysis portions using interface elements. The interface elements are co-linear sets of nodes or surfaces at the boundaries between the two types of portions of the solution domain. In one embodiment, the interface elements are line elements. In the case of structural analysis, an embodiment of the invention uses interface elements to satisfy continuity requirements and/or to match degrees of freedom at interfaces between the two portions of the solution domain.

The invention provides a method for simulating fluid flow within a mold cavity that includes the steps of providing a surface representation of a mold cavity or molded component; automatically separating the surface representation into at least a first portion and a second portion; defining a solution domain corresponding to the first and second portions; and solving for one or more process variables in both portions of the solution domain.

In one embodiment, one or more steps of the method are performed automatically in the sense that they are performed by computer, requiring limited or no input from a skilled technician. For example, in one embodiment, a discretized, hybrid solution domain is produced automatically from a user-provided description of the surface of a component or mold cavity, without requiring additional input from the user. In another example, a discretized, hybrid solution domain is produced automatically from a user-provided description of the surface of a component or mold cavity, where the user also provides (or is prompted to provide) information regarding element aspect ratio, specified edge length (SEL), process model inputs such as boundary conditions and/or initial conditions, and/or other information related to how the solution domain will be used. The production of the solution domain is still automatic, even though a user provides certain specifications, since the separation of the domain into portions and the discretization of the solution domain are subject to internal constraints imposed by the computer-performed method. Certain embodiments provide default values of one or more modeling specifications for which the user is prompted. The default values may or may not be based on the specific component and/or process being modeled. Certain embodiments provide a user the option of providing a modeling specification himself, accepting a pre-determined default value of the modeling specification, and/or using a computer-determined value of the modeling specification based on information about the component and/or process being modeled.

In another aspect, the invention provides a method for automatically defining a hybrid solution domain that includes the steps of dividing a surface representation of a mold cavity or molded component into subsurfaces; matching pairs of subsurfaces, where the two subsurfaces of a given pair are separated by a substantially constant or gradually-varying thickness (but where the separation thickness of one pair may differ from that of another); and defining a hybrid solution domain having a first portion bound at least partly by the matched subsurfaces and a second portion bound at least partly by one or more of the unmatched subsurfaces. In one embodiment, the first portion is amenable to 2.5D analysis while the second portion requires 3D analysis for accurate solution. The method may further comprise using the hybrid solution domain to model a molding process such as injection molding or to determine a structural property of a molded object, such as the warpage of a molded plastic component.

The invention also provides an apparatus for simulating fluid flow within a mold cavity, as well as an apparatus for defining a hybrid solution domain. Each apparatus includes a memory that stores code defining a set of instructions, and a processor that executes the instructions to perform one or more methods of the invention described herein.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. The patent or application file contains at least one drawing executed in color. Copies of this patent or patent application publication with color drawing(s) will be provided by the U.S. Patent and Trademark Office upon request and payment of the necessary fee.

FIG. 13 depicts a cross-section of a three-dimensional T-shaped object and illustrates matching individual subsurfaces of the surface representation of the object to categorize the subsurfaces as matched, unmatched, or edge subsurfaces, according to an illustrative embodiment of the invention.

FIG. 14 depicts a cross-section of a tapered, T-shaped object and illustrates matching individual subsurfaces of the surface representation of the object to categorize the subsurfaces as matched, unmatched, or edge subsurfaces, according to an illustrative embodiment of the invention.

FIG. 15 depicts criteria used in matching subsurfaces in a system for defining a hybrid mesh according to an illustrative embodiment of the invention.

FIG. 19 depicts a plastic component of an automobile dashboard; a hybrid solution domain is automatically determined and an injection molding flow analysis is performed for the component according to an illustrative embodiment of the invention.

FIG. 20 is a graphical representation of STL-formatted CAD output produced during the design of the plastic component in FIG. 19, according to an illustrative embodiment of the invention.

DETAILED DESCRIPTION

Figure 1:
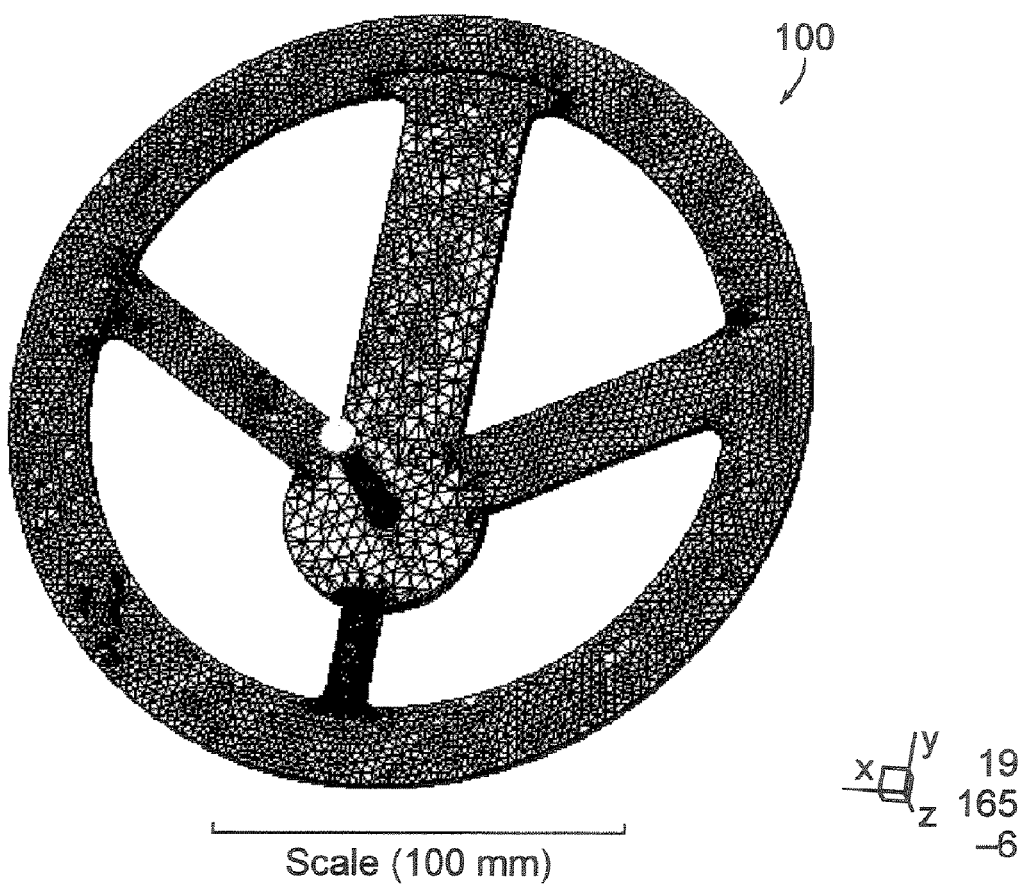
FIG. 1 depicts the solution domain used to simulate injection molding of a component, where the domain is discretized using tetrahedral elements for full 3D analysis, according to an illustrative embodiment of the invention.

Table 1 lists various symbols used herein and is provided as a convenience for the reader. Entries in Table 1 do not serve to limit interpretation of embodiments of the invention described herein.

TABLE 1

| Symbol | Description |
|---|---|
| $\nabla$ | Gradient operator |
| $\alpha$ | Thermal diffusivity: $\dfrac{\lambda}{\rho c_p}$ |
| $\beta$ | Expansivity: $\dfrac{1}{V}\dfrac{\partial V}{\partial T}$ |
| $\delta$ | Kronecker delta |
| $\dot{\gamma}$ | Shear rate |
| $\eta$ | Viscosity |
| $\kappa$ | Compressibility: $-\dfrac{1}{V}\dfrac{\partial V}{\partial P}$ |
| $\lambda$ | Thermal conductivity |
| $\nu$ | Poisson's ratio |
| $\rho$ | Density |
| $\sigma$ | Stress |
| $\tau$ | Stress (deviatoric part) |
| $\upsilon$ | Velocity |
| $\vec{\upsilon}$ | Velocity vector |
| $\upsilon_x, \upsilon_y, \upsilon_z$ | Velocity components |
| $\omega$ | Relaxation factor |
| $\xi$ | Flow 'conductance' |
| $\Delta$ | Increment, i.e., in timestep |
| $\Lambda$ | Locally-defined quantity |
| $\Omega$ | Domain |

TABLE 1-continued

| Symbol | Description |
|---|---|
| $\partial\Omega$ | Boundary of domain, Mold/plastic interface |
| $c_p$ | Specific heat |
| d | Distance of (tet) node from model wall |
| e | Element |
| $\partial e$ | Boundary of element |
| $g, \vec{g}$ | Gravity/body-force and gravity/body-force vector |
| h | Half wall thickness of plastic component/part |
| k | Coefficient matrix of element |
| n | Unit normal vector |
| r | Load vector of element |
| t | Time |
| A | Area |
| $A_e$ | Area of element |
| $A_e^T, A_e^B$ | Top and bottom area of a (shell/wedge) element |
| F | Frozen fraction |
| K | Coefficient matrix of domain |
| L | Laplace coefficients for element |
| $L_{ij}$ | Component of Laplace coefficients $L_{ij} = \dfrac{\partial N_i}{\partial x_k}\dfrac{\partial N_j}{\partial x_k}$ for element |
| N | Interpolation functions for element |
| $N_i$ | Component of interpolation functions for element |
| P | Pressure |
| Q | Heat flux |
| R | Load/residual vector |
| $R_i$ | Component of load/residual vector |
| S | Flow conductance |
| $S_e$ | Elemental flow conductance |
| T | Temperature |
| $T_w$ | Mold wall temperature |
| V | Volume |
| $V^e$ | Volume of element |
| $V_{nj}^e$ | Nodal volume component of element |
| W | Weighting factor |
| Operator or Function | |
| i,j,k,l,m,n | Integer indices, i.e. node number, iteration, space dimension |
| $\vec{v}$ | Vector quantity, i.e. over space dimensions |
| $v_i$ | Component of vector |
| $\underline{K}$ | 1D matrix, i.e. over all nodes |
| $\overline{K}$ | 2D matrix |
| $k_{ij}$ | Component of 2D matrix |
| $\overline{K}^T$ | Transpose of matrix |
| $k_{ij}^T$ | Component of transpose of matrix |
| $\nabla$ | Gradient operator |
| $\vec{a}\bullet\vec{b}$ | Dot product, i.e. $\nabla \bullet (\lambda \nabla T)$ |
| $\vec{a}\times\vec{b}$ | Cross product, i.e. $\nabla \times \vec{S}$ |
| $\bar{\bar{c}}:\bar{\bar{d}}$ | Scalar product of two tensors, $c_{ij}d_{ji}$ |
| $\bar{\bar{\varepsilon}}::\bar{\bar{d}}$ | Tensor product of two tensors, $C_{ik}d_{kj}$ |
| $\delta_{ij}$ | Kronecker delta |
| Element equation quantity | |
| $S_i$ | Nodal value of scalar field S |
| $S^e$ | Element value of scalar field S |
| $\vec{S}_i$ | Nodal value of vector field S |
| $S_{ij}$ | Nodal component (j = 1,2,3) of vector field S |
| $\vec{S}^e$ | Element value of vector field S |
| $S_j^e$ | Element component (j = 1,2,3) of vector field S |
| $\eta^e$ | Viscosity of element (effective viscosity of frozen and molten portions in parallel) |
| $\vec{n}^e$ | Unit normal surface of element e |
| $\vec{r}^e$ | Load vector of element e (RHS) |
| $\int_{V^e} Q\,d\Omega$ | Volume integral of scalar Q over element e |

TABLE 1-continued

Notation

| Symbol | Description |
| --- | --- |
| $\langle Q, N \rangle^e$ | $\int_{V^e} QN d\Omega$ |
| $\int_{S^e} Q\, dS$ | Surface integral of scalar Q over element e |
| $W_i^e$ | Weighting factor at node i of element e |

In general, the invention relates to an apparatus and methods for performing process simulation and structural analysis using a hybrid model. A hybrid model performs both 2.5D analysis and 3D analysis in respective portions of a solution domain. Full three-dimensional analysis of molded parts is often not possible due to constraints on computer memory and CPU time. For example, in order to mesh a plastic component or mold cavity for full 3D analysis, it is often necessary to exceed the limit of addressable memory that is available on a personal computer with a 32-bit Windows operating system. The requirement for computer memory and CPU time increases for the analysis of fiber-filled components (parts), the analysis of injection molding, and the analysis of warpage of injection molded parts after exposure at elevated temperatures.

Thus, in one aspect, the invention provides an apparatus and methods that automatically divide a representation of a component or mold cavity into a 2.5D-analysis portion and a 3D-analysis portion via a subsurface matching technique, and that automatically discretize the two portions to form a solution domain in which hybrid analysis is performed. Since many molded components contain thin areas in which 2.5D analysis is appropriate, run times and memory requirements are greatly decreased for many applications.

FIG. 1 through FIG. 5 provide an introductory demonstration that shows the simplification provided by application of an embodiment of the invention to simulate an injection molding process. FIG. 1 depicts the solution domain 100 for simulating injection molding of a plastic component or mold cavity, determined using a traditional technique. The solution domain 100 of FIG. 1 is discretized using tetrahedral elements for full 3D analysis. Overall discretization is complex, since the entire domain is made up of three-dimensional tetrahedral elements, sized sufficiently small so that simulation is accurate. For example, values of process variables such as temperature, pressure, and fluid velocity, may vary more in geometrically complex portions of the domain, thus requiring smaller discretization for accurate simulation in these regions. In addition to the dense discretization, the full 3D governing equations must be solved throughout the entire domain in order to solve for distribution of process variables using the solution domain 100 of FIG. 1.

Figure 2:
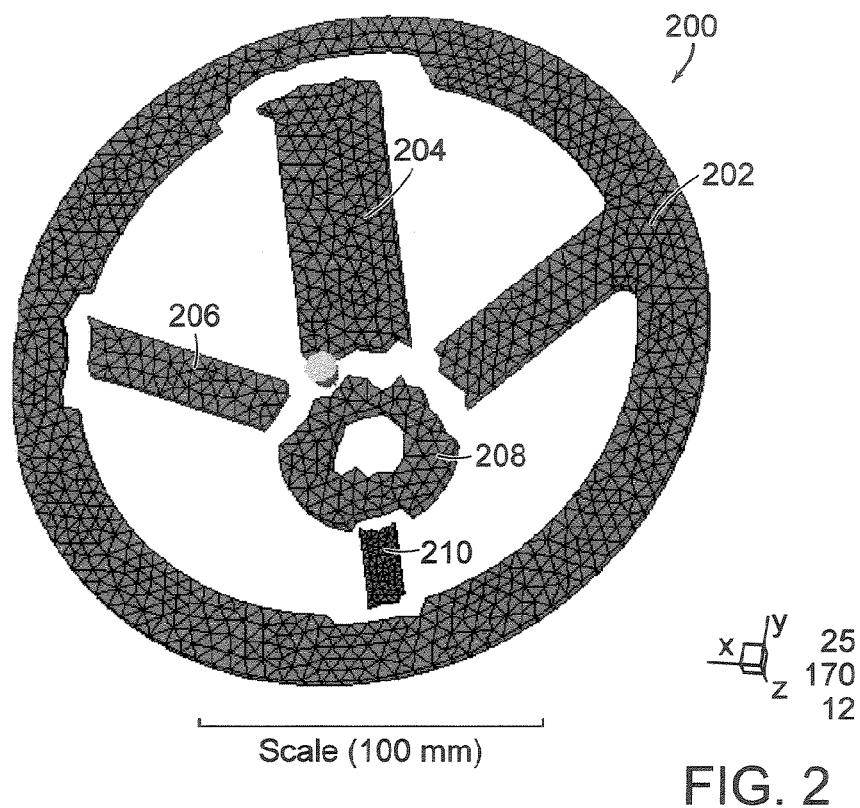
FIG. 2 depicts a portion of the solution domain used to simulate injection molding of the component in FIG. 1, where the portion of the domain is discretized using wedges for 2.5D analysis or application of the dual domain method, according to an illustrative embodiment of the invention.

Certain portions of the solution domain 100 of FIG. 1 are thin sections, each having a relatively constant thickness. It is not necessary to perform full 3D analysis in these sections. For example, methods of the invention can automatically divide a surface representation of a component or mold cavity into a portion having pieces each with a relatively constant thickness, where this portion can be modeled using a 2.5D analysis technique. FIG. 2 depicts a portion of the solution domain 200 of the component/mold cavity in FIG. 1 which can be modeled using a 2.5D analysis technique. This 2.5D-analysis portion 200 includes pieces 202, 204, 206, 208, and 210, each having relatively constant thickness (although the thickness of one piece may differ from the thickness of another piece). The 2.5D-analysis portion is automatically discretized using 6-node wedges. Alternatively, dual domain elements can be used instead of wedges.

Figure 3:
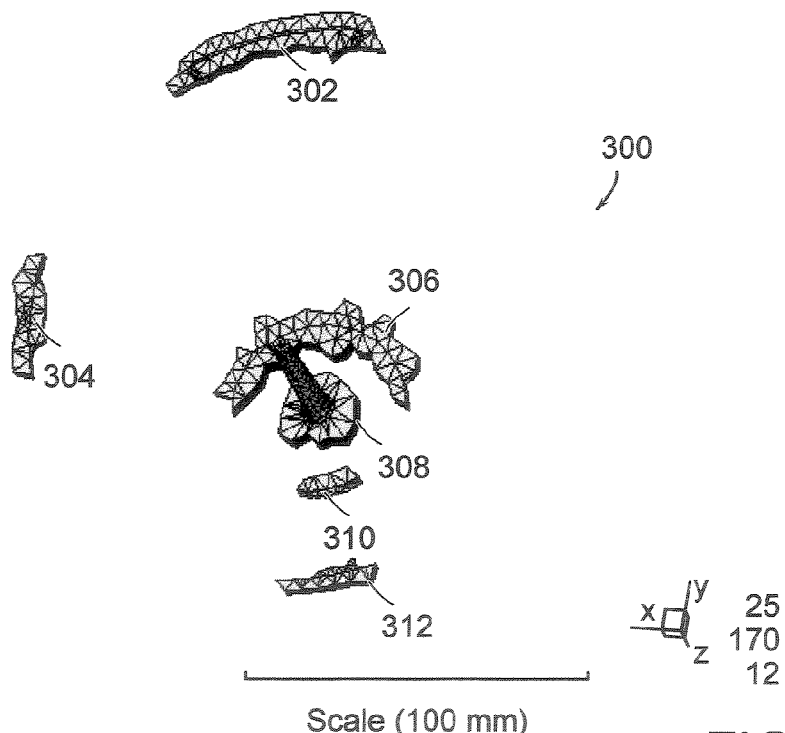
FIG. 3 depicts a portion of the solution domain used to simulate injection molding of the component in FIG. 1, where the portion of the domain is discretized using tetrahedral elements for 3D analysis, according to an illustrative embodiment of the invention.

The remaining portion of the solution domain for the component/mold cavity is automatically discretized using 3D elements, such as tetrahedral elements, suitable for 3D analysis. FIG. 3 depicts the portion 300 of the solution domain of the component/mold cavity in FIG. 1 that is discretized using 3D tetrahedral elements. This 3D-analysis portion 300 includes pieces 302, 304, 306, 308, 310, and 312. These pieces represent portions of the component/mold cavity at the intersection of two or more surfaces, at corners, and at other locations where thickness varies suddenly.

Figure 4:
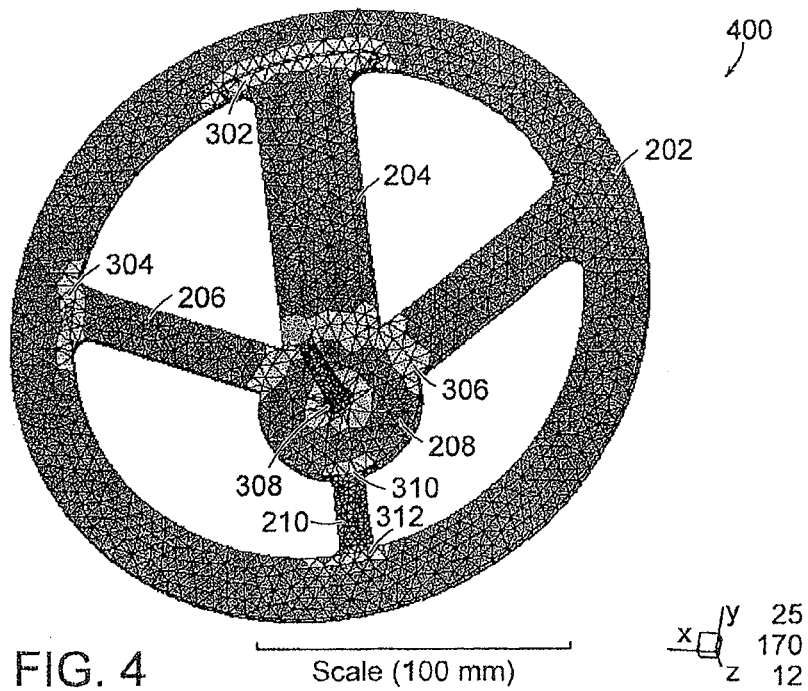
FIG. 4 depicts a hybrid mesh solution domain used to simulate injection molding of the component in FIG. 1, where one portion of the domain is discretized using wedges for 2.5D analysis, and another portion of the domain is discretized using tetrahedral elements for 3D analysis, according to an illustrative embodiment of the invention.

FIG. 4 depicts a hybrid mesh solution domain 400 used to simulate injection molding of the component/mold cavity in FIG. 1. The solution domain 400 contains pieces of relatively constant thickness, shown in FIG. 2, as well as the remaining pieces, shown in FIG. 3. The hybrid solution scheme solves for the distribution of one or more process variables—such as pressure, velocity, and temperature—as a function of time, throughout the solution domain 400. The scheme includes use of a 2.5D analysis technique for the wedge elements and a 3D analysis technique for the tetrahedral elements. Interface elements lie at the boundary between the wedge elements and the tetrahedral elements, where conservation equations and continuity requirements are enforced.

Figure 5:
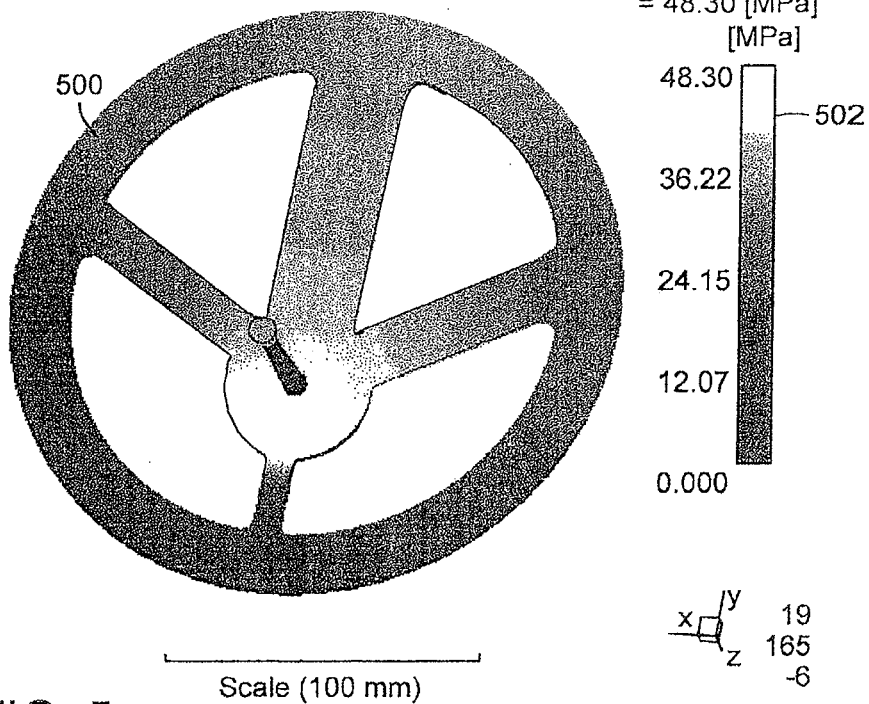
FIG. 5 depicts the pressure distribution at the filling/packing switchover point, obtained using the hybrid mesh solution domain of FIG. 4 and a combined 2.5D/3D approach, according to an illustrative embodiment of the invention.

FIG. 5 depicts pressure distribution 500 at a particular point in time during the injection molding of the illustrative component/mold cavity in FIG. 1 for which a hybrid solution domain is determined and a combined 2.5D/3D flow analysis is performed according to an embodiment of the invention. In this case, the point in time corresponding to the pressure distribution 500 shown is the switchover from the filling phase of injection molding to the packing phase. The method for automatically determining the hybrid solution domain and the method of performing the combined 2.5D/3D flow analysis is described in more detail herein below.

Figure 6:
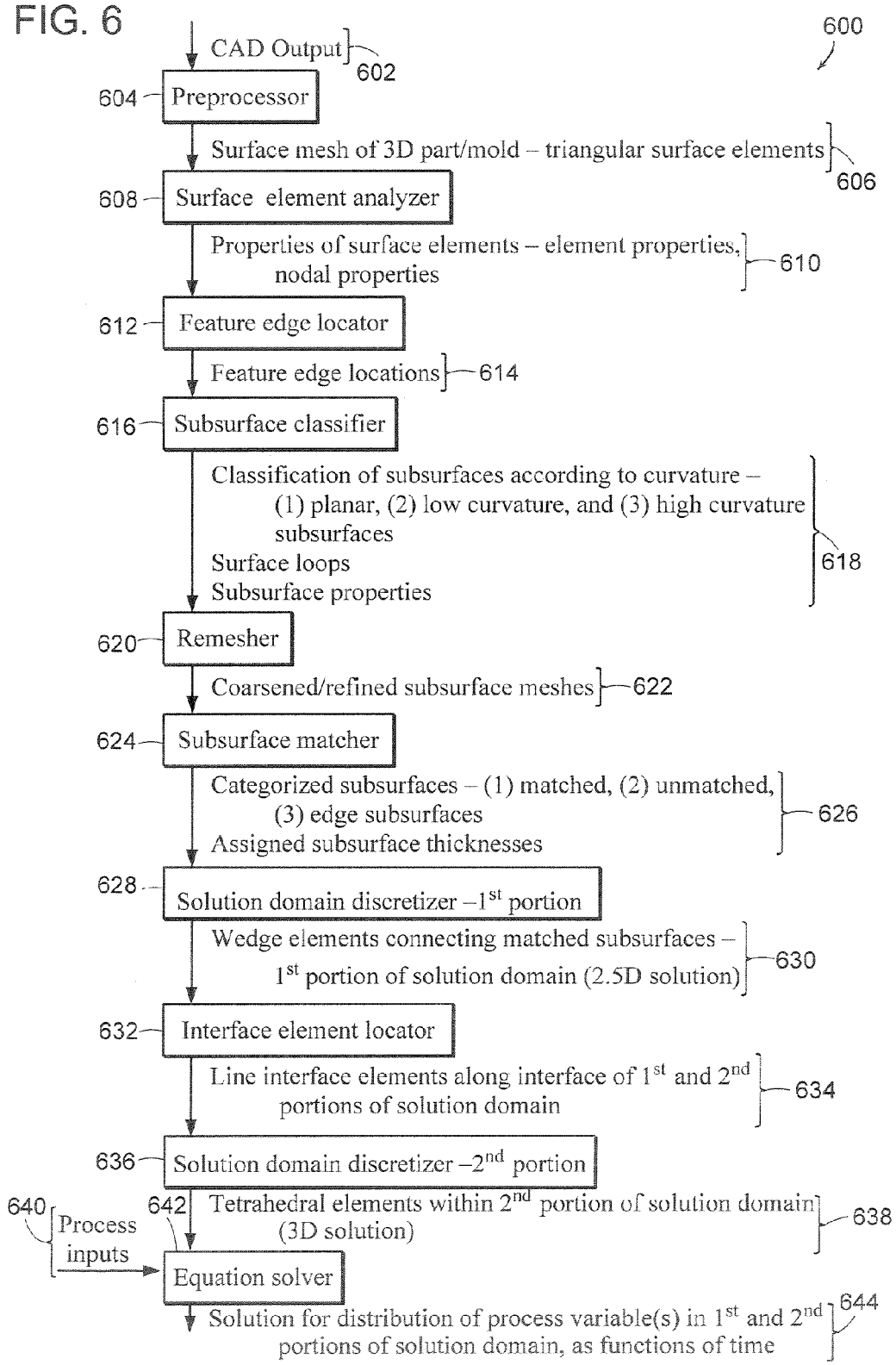
FIG. 6 is a schematic flow diagram depicting components in a system for automatically defining a hybrid mesh solution domain, used to solve for the distribution of process variables as functions of time according to an illustrative embodiment of the invention.

FIG. 6 is a schematic flow diagram 600 depicting components in a system for automatically defining a hybrid mesh solution domain, which is used to solve for the distribution of process variables as functions of time. Embodiments of the invention also include systems that automatically define a hybrid mesh solution domain without necessarily using the solution domain to solve for process variables. The system includes components for preprocessing CAD system output 604 to provide an overall surface mesh; analyzing surface elements 608 of the surface mesh; locating feature edges 612 of the surface mesh; classifying subsurfaces 616 of the surface mesh; remeshing 620 the surface mesh; matching subsurfaces 624 of the surface mesh, thereby identifying portions of the solution domain in which 2.5D analysis can be performed; discretizing the 2.5D-analysis portion 628 of the solution domain; locating interface elements 632; discretizing the 3D-analysis portion 636 of the solution domain; and solving the governing equations 642 subject to initial conditions, boundary conditions, and process inputs to obtain the solution for the distribution of process variables throughout the solution domain, as functions of time. Each of these components are discussed in more detail herein below.

The preprocessor component 604 in FIG. 6 uses as input a geometric description of a component to be manufactured, for example, CAD output 602, and turns it into a representation for the surface of the three-dimensional component/part or mold cavity 606. Input can be any convenient form of geometric description. For example, the preprocessor component

604 can use CAD system output in Initial Graphics Exchange Specification (IGES) format (for example, IGES Version 5.3, as well as later and earlier versions). In another example, the component 604 uses a CAD system output file associated with a common geometry kernel, such as Parasolids® or ACIS®. Furthermore, the component 604 may use a CAD system output file associated with a proprietary geometry kernel, such as Pro-Engineer® from Parametric Technology Corporation of Needham, Mass., or I-DEAS® from Structural Dynamics Research Corporation of Milford, Ohio. A further means of usable CAD system output includes stereolithography (STL) formatted files, used in creating 3D prototypes. This format consists of planar triangles with no connectivity in the finite element sense. Any file format that describes a mesh covering the outer surfaces of a three-dimensional solid region may be used as input. A remesher (i.e. see component 620 in FIG. 6, discussed below) is used to improve the mesh quality for subsequent processing.

The preprocessor 604 of FIG. 6 meshes the outer surfaces of the three-dimensional part/component/mold cavity with a surface mesh, for example, a mesh of triangular surface elements. Such a mesh is frequently available from a CAD system using a geometry kernel. For CAD output in stereolithography format, it is generally necessary to remesh the part/component/mold cavity surface representation to create a set of triangles with a reasonable aspect ratio. A method of remeshing is depicted in component 620 of FIG. 6, discussed in more detail herein below. Alternatively, the surface representation provided by the preprocessor component 604 is made up of quadrilateral elements. Other two-dimensional elements are also possible.

Once the preprocessor 604 in FIG. 6 produces a surface mesh of triangular surface elements, a surface element analyzer 608 determines properties of the surface elements, and stores them for later use. The surface element properties are used to divide the surface mesh into subsurfaces, which are then classified and matched to determine a first portion of the solution domain where simplified analysis (i.e. 2.5D analysis) is sufficient. The surface element analyzer 608 of FIG. 6 determines element properties and nodal properties 610 associated with each of the surface elements. For example, the surface element analyzer 608 computes and stores the following element properties for each of the surface elements:

Area;
Normal at the element centroid;
Edge lengths of the element;
Internal angles at the vertices of the element;
Adjacent elements (contiguous elements);
Bending angle between adjacent elements (the angle between normals of adjacent elements); and
Bending curvature between adjacent elements (the curvature of a cylindrical surface on which the bending edge and nodes of the adjacent element lie).

Figure 7B:
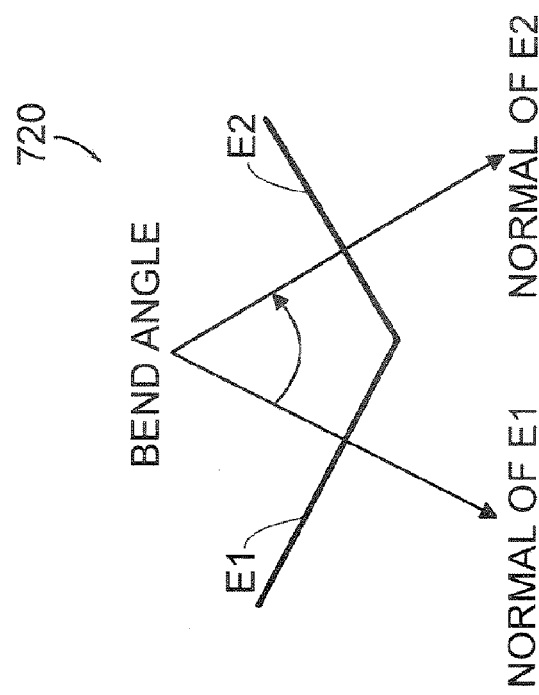
FIG. 7B depicts the determination of bending angle between the two adjacent elements from FIG. 7A according to an illustrative embodiment of the invention.
Figure 7A:
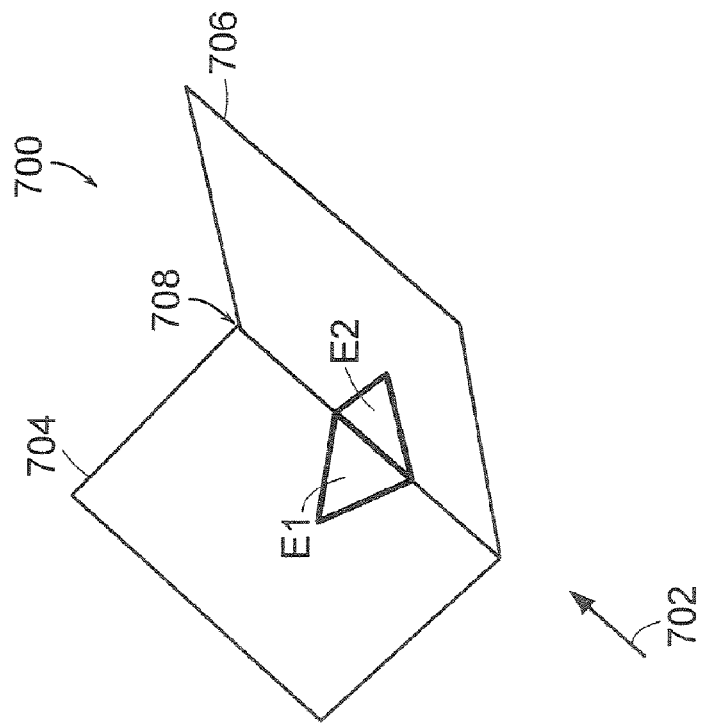
FIG. 7A depicts two adjacent elements on two different subsurfaces, as analyzed in a system for defining a hybrid mesh according to an illustrative embodiment of the invention.

FIGS. 7A and 7B demonstrate computation of bending angle between adjacent elements, determined by the surface element analyzer 608 of FIG. 6. Elements E1 and E2 of FIG. 7A happen to lie along a feature edge 708 separating two subsurfaces 704, 706. FIG. 7B depicts a cross-sectional view of elements E1 and E2 as viewed in the direction of arrow 702 in FIG. 7A. The bend angle between adjacent elements E1 and E2 is shown in FIG. 7B as the angle between the normals of elements E1 and E2.

Figure 8B:
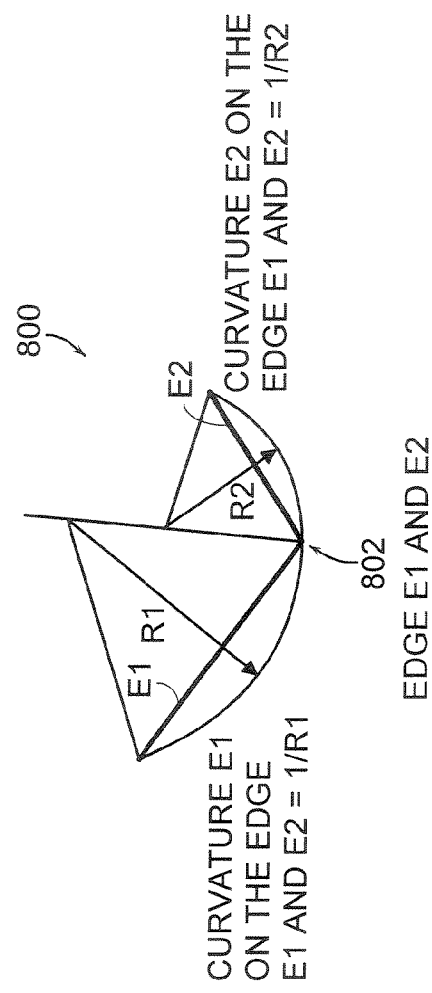
FIG. 8B depicts the determination of curvatures associated with the two adjacent elements from FIG. 8A according to an illustrative embodiment of the invention.
Figure 8A:
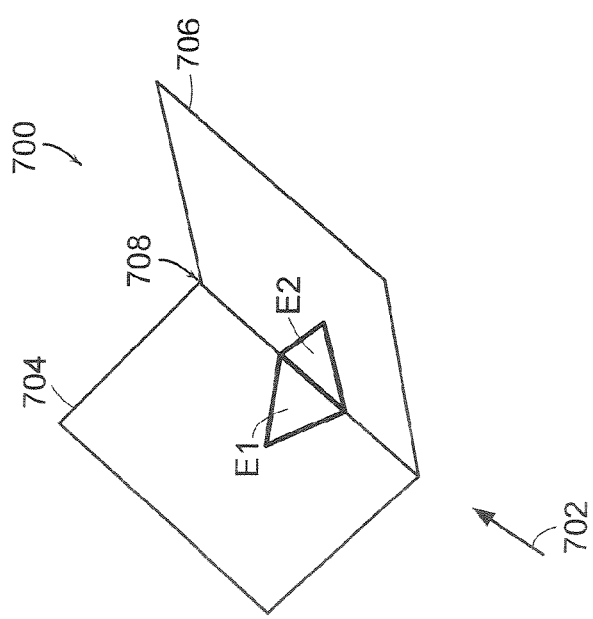
FIG. 8A depicts two adjacent elements on two different subsurfaces, as analyzed in a system for defining a hybrid mesh according to an illustrative embodiment of the invention.

FIGS. 8A and 8B demonstrate computation of bending curvature (or "element curvature") between adjacent elements, determined in the surface element analyzer 608 of FIG. 6. FIG. 8B depicts a cross-sectional view of elements E1 and E2 as viewed in the direction of arrow 702 in FIG. 8A. Bending (element) curvature associated with element E1 on the edge E1 and E2 equals 1/R1, while bending (element) curvature associated with element E2 on the edge E1 and E2 equals 1/R2, as shown in the diagram 800 of FIG. 8B. The bending curvature is the curvature of a cylindrical surface on which the bending edge and nodes of the adjacent element can lie.

In addition to element properties, the surface element analyzer 608 of FIG. 6 determines nodal properties 610 associated with each of the surface elements of the surface mesh 606. In one embodiment, the following nodal properties are computed and stored for each of the surface elements:

Measure of minimum curvature at the node;
Connecting elements (the set of elements connected to the node); and
Number of edges connected to the node.

The minimum curvature at a given node is the smallest bending curvature of all the elements attached to the given node.

The feature edge locator 612 of FIG. 6 then uses the properties computed above to determine the location of feature edges of the 3D part/mold being modeled. A feature edge is an edge that would be apparent to one viewing the part/mold. The feature edge locator 612 identifies elements of the surface mesh adjacent to a feature edge. In one embodiment, the feature edge locator identifies feature edges by first classifying each of the elements of the surface mesh as planar elements or "curved" elements. For example, a planar (triangular) element either (1) has each of its three bend angles either equal to zero or greater than a given feature edge threshold, or (2) has at least one adjacent planar element where the bending angle between the element and the adjacent planar element is zero. All other elements are classified as "curved" elements (even though, individually, they are actually planar). In one embodiment, the feature edge locator 612 in FIG. 6 identifies feature edges at the following locations: (1) where the bend angle between two adjacent elements is greater than a given feature edge threshold (for example, from about 40° to about 45°); (2) at the edge between planar elements and curved elements; and (3) where there is a significant change in bending (element) curvature direction, for example, as shown in the diagram 800 of FIG. 8B.

Once the feature edge locator has located feature edges, further organization of the subsurfaces is performed to identify the remaining edges separating all of the subsurfaces of the surface mesh. The subsurface classifier 616 in FIG. 6 performs an element-by-element, pseudo-recursive process to group elements into subsurfaces according to bending angle and bending curvature, so that adjacent elements having similar bending curvature are grouped together. High-curvature subsurfaces will generally bound regions of the 3D-analysis portion of the solution domain, while planar and low-curvature subsurfaces will generally bound regions of the 2.5D-analysis portion of the solution domain. The pseudo-recursive process performed by the subsurface classifier 616 begins by determining the location of large planar subsurfaces (sheets) of the surface mesh. In one embodiment, a large planar sheet is a planar sheet in which one of its elements has an area greater than a threshold value, based on the mesh geometry size, average associated thickness, and number of elements. Here, the size of the elements are based on a reasonable aspect ratio. By identifying large planar sheets first, the subsurface classifier 616 avoids grouping large elements into curved subsurfaces. After a large planar sheet is identified, adjacent planar elements are added to the large planar sheet as long as planar surface (sheet) constraints are met. In one embodiment, the planar sheet constraints are as follows:

(1) The edge bend angle inside the sheet (i.e., the maximum element-to-element bend angle along the edge, as illustrated in FIGS. 7A and 7B) is less than a tolerance value, set, for example, from about 5° to about 15°; and (2) Each node of the sheet has an off-distance below a tolerance level, set from about 0.05 times an average associated thickness (see below) to about 0.1 times the average associated thickness;

where "off-distance" is the perpendicular distance from a node to the "plane of the subsurface," and the plane of the subsurface is the plane defined by the largest element of the subsurface.

The next step in the subsurface classifier 616 is the identification of "other" (not large) planar sheets. In one embodiment, all connecting planar (non-"curved") elements that are not already part of a large planar sheet make up one of these "other" planar sheets.

The next step in the subsurface classifier 616 is the element-by-element, pseudo-recursive classification of low-curvature subsurfaces, followed by high-curvature subsurfaces. Adjacent "curved" elements (as defined above) with similar curvatures are grouped into an individual curved sheet (subsurface). The pseudo-recursive process proceeds by applying criteria to determine whether an adjacent "curved" element belongs to the current curved subsurface. In one embodiment, there are four criteria used to determine if a neighboring (adjacent) element belongs to the current curved subsurface:

(1) The bending angle between the neighboring (candidate) element and the current subsurface is less than about 1°;

(2) The curvature of the neighboring element is less than a threshold value (applied for low-curvature subsurfaces). For example, a low-curvature subsurface must have a maximum curvature less than or equal to about (0.06/thickness), where "thickness" is the average thickness associated with the subsurface (see below);

(3) The curvature of the current subsurface and the neighboring element is larger than about (0.5/thickness), where "thickness" is the average thickness associated with the current subsurface (applied for high-curvature subsurfaces); and (4) The bending angle between the neighboring element and the current subsurface is less than a threshold edge bending angle (set, for example, from between about 30° and about 45°), and the curvature of the neighboring element is less than about 4 times the minimum curvature of the current subsurface, where the minimum curvature of the subsurface is the smallest element-to-element bend angle of all elements belonging to the subsurface.

The next step in the subsurface classifier 616 is to group all the remaining elements into planar subsurfaces. The subsurface classifier 616 then identifies the final edges separating the subsurfaces, and computes and stores the following properties for each edge:

Length;
Bending angle;
Direction of bending (in or out); and
Adjacent elements.

Next, the subsurface classifier 616 identifies surface loops. Surface loops are the oriented edges of the subsurfaces. For example, a rectangular surface with a hole cut in it will have two associated loops—one for the outer edges of the rectangle and one describing the interior hole. The subsurface classifier 616 computes and stores the following loop properties:

Length; and
Edges connected to the loop.

Finally, the subsurface classifier 616 computes and stores the following properties for each subsurface:

Perimeter;
Area;
Nodes in the subsurface;
Elements in the subsurface;
Edges;
Loops; and
Minimum measure of curvature associated with the subsurface.

Subsurface curvature, as described herein, is different from element curvature in that subsurface curvature is characterized by a minimum, maximum, average, and/or range of the element edge curvatures belonging to the subsurface.

Once the subsurfaces are classified, the mesh associated with each subsurface is further refined or coarsened according to given criteria for optimizing mesh quality and efficiency, for purposes of numerical analysis. For example, the remesher 620 in FIG. 6 coarsens or refines the mesh of a given subsurface according to a user-defined value of Specified Edge Length (SEL). The larger the value of SEL, the coarser the remeshed mesh will be and, conversely, the smaller the value of SEL, the finer the remeshed mesh will be. In one embodiment, a default value of SEL is calculated based on the complexity of the model. A user can increase or decrease the value of SEL to trade off accuracy for analysis speed and, vice versa, subject to internal constraints. In one embodiment, internal constraints are imposed on allowable values of SEL such that the maximum off-distance of the remeshed nodes to their positions in the original mesh is below a given threshold (for example, from about 1% to about 5% of SEL), and such that the maximum bend angle is below a given threshold (for example, a value from about 15° to about 30°).

In one embodiment, the remesher 620 in FIG. 6 performs the following sequence:

(1) After all the subsurfaces of the surface mesh are classified by the subsurface classifier 616, the boundaries of the subsurfaces (edges) are remeshed. Here, the loops of each sheet are divided into lengths (SEL) by inserting and/or merging nodes on the current set of edges that define the loops;

(2) Constraints are applied in the merging of edge nodes according to internal constraints on SEL. These constraints ensure that the loop does not drift substantially from its initial shape. For example:

(a) Bend angle constraints are applied: If the loop is bent more than a specified bend angle, then that section of the loop is not subject to the edge length criteria (edge nodes should not be merged according to SEL).

(b) Chord height constraints are applied: If the chord height of a short edge node (a node on an edge shorter than SEL) with respect to its adjacent node is larger than a specified length, then that section of the loop is not subject to the edge length criteria (edge nodes should not be merged according to SEL); and (3) SEL is applied to the mesh of the subsurface to be remeshed. For example, an iterative "bisection and merge algorithm" is performed as follows:

(a) Start with the longest element in the subsurface and insert nodes by bisecting the longest edge of the element if the edge is significantly larger than SEL (for example, if the edge is larger than about 1.5 times SEL).

(b) Look for element edges that are significantly shorter than SEL (for example, where the edge is smaller than 0.5 times SEL), and merge these nodes together.

(c) Repeat until all the element edge lengths lie in a close range of SEL.

Figure 9:
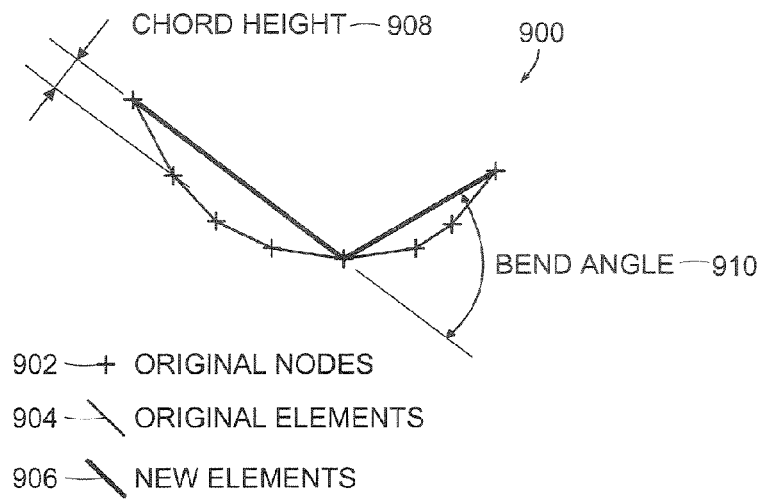
FIG. 9 depicts the application of criteria to limit remeshing of subsurfaces in a system for defining a hybrid mesh according to an illustrative embodiment of the invention.

FIG. 9 depicts the application of "bend angle constraints" and "chord height" constraints in item (2) above. The chord height 908 must be less than a given threshold, and the bend angle must be less than a given threshold in order for SEL to be applied in coarsening a mesh by merging original nodes 902 on the loop to form new elements 906. FIG. 9 shows seven original elements 904 which are replaced by two new elements 906 following merging according to a value of SEL, subject to bend angle constraints and chord height constraints.

Note that in all of the mesh modification operations, the element node linkages can be modified to optimize the aspect ratio about a node at any time in the process. This is a local optimization operation, and can be defined as one or more "rules" for meshing around nodes. This causes certain components of the system represented in FIG. 6 to be iterative and/or recursive.

Figure 10:
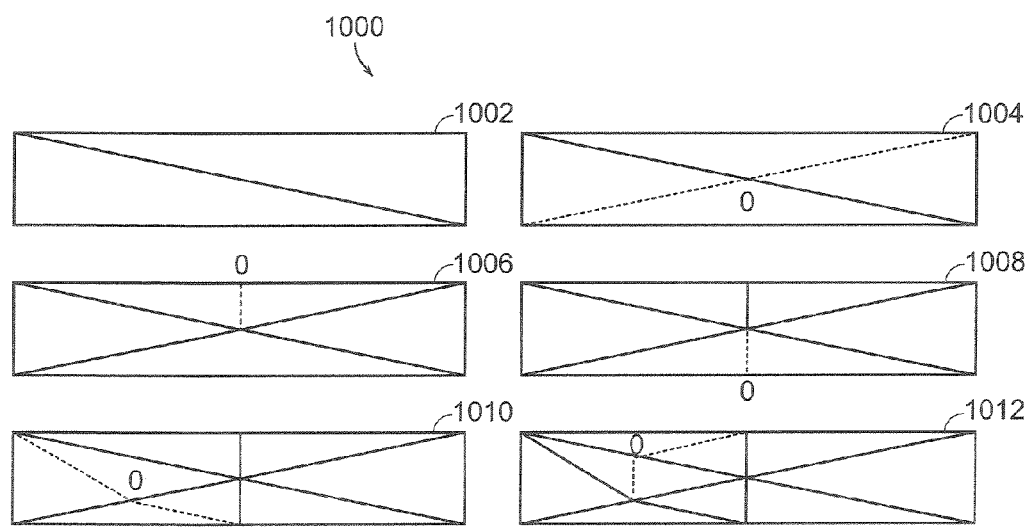
FIG. 10 shows the discretization of a subsurface at sequential stages of a remeshing procedure according to an illustrative embodiment of the invention.
Figure 11:
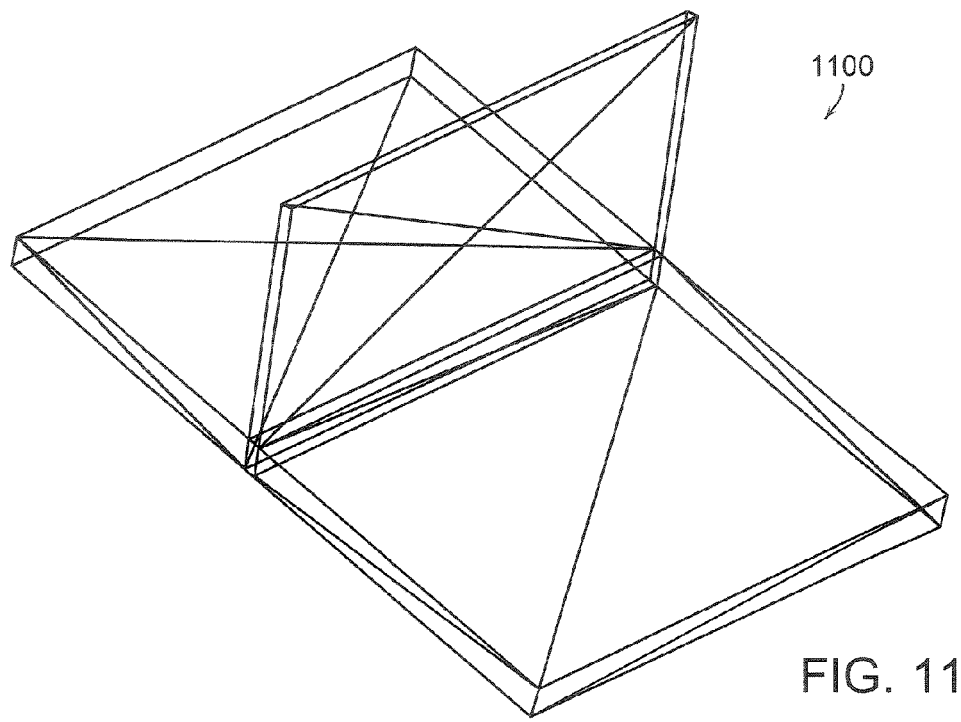
FIG. 11 shows an initial stereolithography surface representation used in a remeshing procedure according to an illustrative embodiment of the invention.
Figure 12:
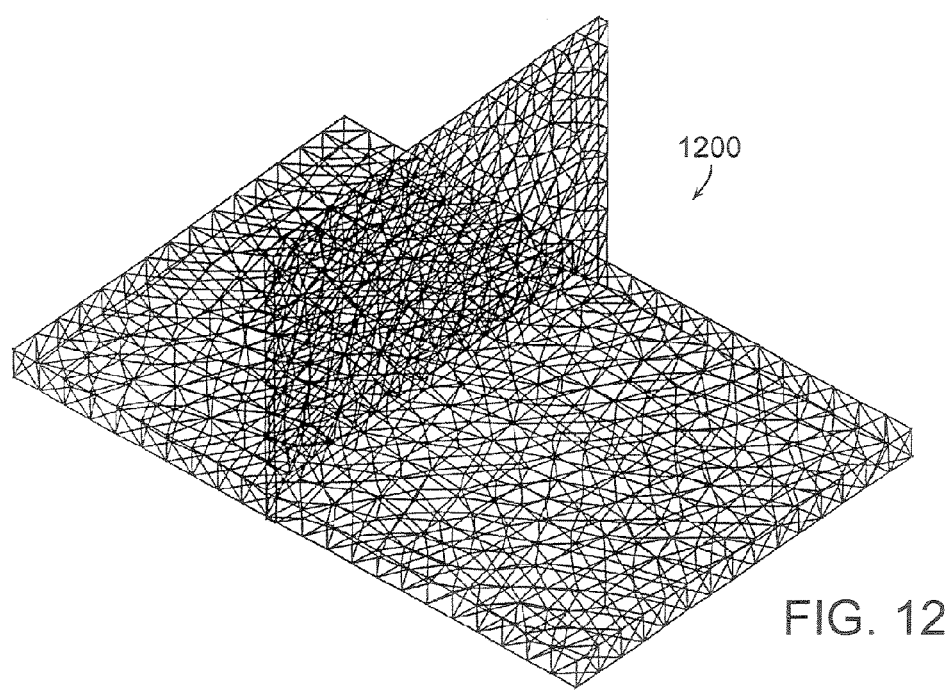
FIG. 12 shows the surface representation of FIG. 11 following remeshing according to an illustrative embodiment of the invention.

FIG. 10 is a schematic 1000 that demonstrates the formation of additional elements on a subsurface 1002 at sequential stages of a remeshing procedure, as in the "bisection and merge" algorithm in item (3) above, or as in a local optimization operation. In this case, the mesh of a subsurface is further refined by bisecting the longest side of an element on the subsurface to create additional elements. For example, mesh 1002 is the initial mesh. The mesh is refined by defining a node at the midpoint of the longest element side and extending lines to one or more vertices not yet connected to the midpoint, thereby creating one or more additional triangles. This is illustrated by subsequent meshes 1004, 1006, 1008, 1010, and 1012 in FIG. 10. In meshes 1004, 1006, 1008, 1010, and 1012, the midpoint of the longest side (denoted by "o") and the dotted lines extending from this point define the new elements. Remeshing continues until the elements satisfy one or more criteria on size (i.e., given by SEL). For example, FIG. 11 shows an initial stereolithography surface representation 1100 used in a remeshing procedure. FIG. 12 shows the surface representation of FIG. 11 after remeshing (1200) using the bisection algorithm discussed above.

After the subsurfaces are remeshed, the subsurface matcher 624 in FIG. 6 determines which subsurfaces are "matched subsurfaces," and the remaining subsurfaces are each classified as "unmatched subsurfaces" or "edge subsurfaces." The matched subsurfaces are later connected with wedge elements to form a first portion of the solution domain—the portion in which 2.5D analysis can be accurately performed.

Matched subsurfaces are those that are related to another surface such that a notion of thickness between them can be sensibly defined. The thickness between matched subsurfaces is either substantially invariant or gradually varying. For example, FIG. 13 depicts a cross-section 1300 of a T-shaped object (a filleted rib) and illustrates matching individual subsurfaces of the overall surface representation. In the cross-section 1300, line segments ab, cd, and gh are on edge subsurfaces. Line segments aj and ed are matched to bc. Line segment fg is matched to hi. The curved sections ij and ef are unmatched. It is not possible to sensibly define a thickness of unmatched subsurfaces ij and ef.

FIG. 14 further illustrates the concept of matching subsurfaces. FIG. 14 shows a cross section 1400 through a filleted rib. Here, line segments ab, cd, and gh are on edge subsurfaces. Line segments aj and ed are matched to bc. Line segments fg and hi are matched. Curved sections ij and ef are unmatched. Note that line segments fg and hi are still considered matched, despite the taper. However, if the taper is extreme, the surfaces forming the tapered ribs may not be matched.

Matched subsurfaces are subsurfaces containing matched elements. Matching is performed element-by-element and subsurface-by-subsurface until all the elements that can be matched are considered. In one embodiment, the subsurface matcher 624 of FIG. 6 applies criteria to determine whether two triangular elements are matched or not. In one embodiment, these two criteria are (1) whether the "Triangle Match Angle" (TMA) is less than a given value (for example, from about 30° to about 45°) and (2) whether "Triangle Match Distance" (TMD) is less than a given value based on the mesh average thickness, the matching subsurface's average width, and the matching subsurface's boundary characteristic. A boundary characteristic of a subsurface is the ratio of its expending edge length to the total edge length. The determination of TMA and TMD are demonstrated in the diagram 1500 of FIG. 15. To determine TMA, first, find the centroid of the triangle to be matched (Triangle A in FIG. 15). Then, project it along its normal to find the intersection with a triangle on a subsurface on the opposite side of the model (surface representation). Here, this is the "Projection point" on Triangle B in FIG. 15. TMA is then calculated as shown in FIG. 15. Triangle Match Distance, TMD, is the perpendicular distance of the projection used in calculating TMA, shown in FIG. 15.

The subsurface matcher 624 in FIG. 6 uses a "collapse" procedure to identify which of the unmatched subsurfaces are edge subsurfaces, and to assign the following subsurface properties: (1) a sheet (subsurface) type, indicating how it was collapsed (primary/secondary or edge); (2) a "move distance" for each node; and (3) a "move vector" for each node.

Figure 16A:
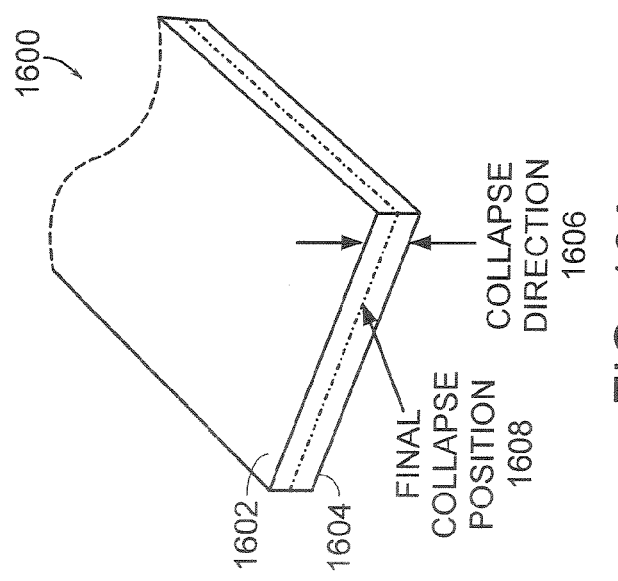
FIGS. 16A, 16B, and 16C depict steps in a collapsing procedure for categorizing subsurfaces as matched, unmatched, and edge subsurfaces, according to an illustrative embodiment of the invention.
Figure 16B:
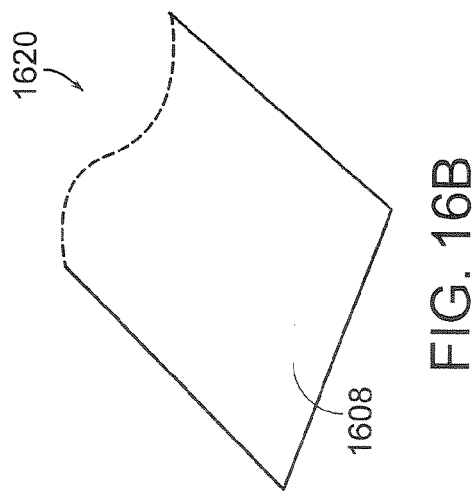
Figure 16C:
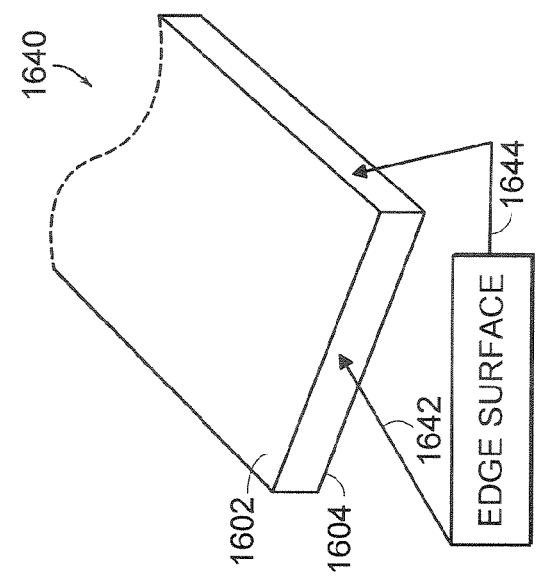

FIGS. 16A through 16C demonstrate steps in an example collapse procedure. Matched subsurfaces 1602 and 1604 are "collapsed" together to a final collapse position 1608, shown in diagram 1600 of FIGS. 16A and 16B. The collapse direction is established using the matching information from the previous mesh step and the subsurface properties, including the area, eigendimension, and the boundary characteristic. "Primary sheets" are the subsurfaces that are chosen to be moved first. The moving distance of a node on a primary sheet provides the average matching distance of the sheet. The moving distance of a node on a secondary sheet is the distance from the node to the opposite primary sheet minus the primary sheet moving distance. After collapse, the nodes on both the primary 1602 and secondary sheets 1604 in FIG. 16A have been moved to the midplane 1608. Non-matched sheets (subsurfaces) (1642, 1644 of FIG. 16C) do not move in the collapsing process. A non-matching sheet whose area shrinks to about 20% or less of its original size after primary and secondary sheets are collapsed to the midplane is considered an "edge subsurface." Subsurfaces 1642 and 1644 in FIG. 16 are edge subsurfaces, since their areas shrink to zero (or near zero), in the example shown in FIG. 16. Note that the collapse procedure is used to identify edge surfaces and to assign subsurface properties. The collapse procedure is not used to consolidate the mesh into a midplane representation. The mesh is "re-inflated" to its original node positions, shown in diagram 1640 of FIG. 16C.

After categorizing the subsurfaces, the subsurface matcher 624 of FIG. 6 assigns thicknesses to the subsurfaces. These thicknesses are used, for example, in performing a 2.5D flow analysis (i.e. using a Hele Shaw approximation) in a first portion of the solution domain. The subsurface matcher 624 assigns a thickness to elements on matched subsurfaces equal to the average distance between the subsurfaces. Elements on an edge subsurface are assigned the thickness of the matched subsurfaces to which they are attached. Elements on unmatched subsurfaces are assigned an average thickness of surrounding elements on matched subsurfaces. In some embodiments, thicknesses are not assigned to edge subsurfaces and/or unmatched subsurfaces, as they may be unnecessary for performing a flow analysis in certain applications.

The subsurface matcher 624 categorizes each of the subsurfaces of the model as either a matched, unmatched, or edge subsurface, and determines a set of paired elements that define the possible 2.5D-analysis portion of the solution domain between the matched subsurfaces (the 2.5D-analysis portion may comprise one or more non-contiguous regions). After the possible 2.5D regions are identified, the final 2.5D regions making up the 2.5D-analysis portion of the solution domain are determined by removing all paired elements which: (1) connect to surface edges for which the edge bending angle is greater than a given value (for example, about 30°); (2) connect to unmatched elements that do not belong to an edge surface; and/or (3) form a small patch of 2.5D regions. The remaining paired elements define (bound) the 2.5D-analysis portion of the solution domain (first portion), and the rest of the elements define (bound) the 3D-analysis portion of the solution domain (second portion).

After the solution domain is divided into a 2.5D-analysis portion and a 3D-analysis portion, the portions are discretized using the matched, unmatched, and edge subsurface elements. In one embodiment, the element pairs in the 2.5D-analysis portion are converted into 6-node wedge elements, and the remaining subsurface elements are closed up with triangular elements to form the 3D-analysis regions, which are meshed with tetrahedral elements.

The first portion solution domain discretizer 628 in FIG. 6 converts the matched element pairs that define the 2.5D-analysis portion (first portion) into 6-node wedge elements (where each wedge element has one node at each of its six corners). Calculations are performed at each grid point. The six nodes defining the wedge element may all have different pressures, and solution grid points through the thickness of the wedge may provide increased accuracy. However, in thin areas where the flow approaches two-dimensional flow, the pressures on the top three nodes of the wedge are about the same as the pressures on the respective bottom three nodes of the wedge, and either no grid points are needed, or only 1, 2, or 3 grid points are needed, for example. In one example, the number of grid points used along the thickness of an element is in a range from about 3 to about 40. In another embodiment, the number of grid points used along the thickness of an element is in a range from about 8 to about 20. A lower number of grid points provides a faster analysis, which may be more suitable for design iterations early in the development of a product. For each wedge element, there may be any number of grid points through the thickness of the element, depending on the desired accuracy of the model. In some embodiments, there are no solution grid points between element nodes, and solutions are obtained only at the six nodes of each element. With the addition of grid points, each wedge is a discretely layered element. In an alternative embodiment, each wedge is a continuously layered element.

The interface element locator 632 in FIG. 6 defines interface elements along the boundary between the first portion (i.e. 2.5D-analysis portion) and the second portion (i.e. 3D-analysis portion) of the solution domain. The interface element locator 632 uses one or more of the following types of interface elements, for example, according to the types of first portion and second portion elements to be linked:

- Disk-shaped element with a central node on the end of a 1D-analysis element and a plurality of surrounding nodes belonging to the 3D-analysis region elements which contact the end face of the 1D-analysis element;
- Line-shaped element which connects the 2.5D-analysis element (i.e. wedges) and 3D-analysis elements (i.e. tetrahedra);
- Rectangular-shaped element with 4 corner nodes belonging to a 2.5D-analysis element (which may or may not connect to 3D-analysis elements) and any number of 3D-analysis element nodes lying on and inside that 2.5D-analysis element; and
- Triangular-shaped element with 3 corner nodes belonging to a 2.5D-analysis element (which may or may not connect to 3D-analysis elements) and any number of 3D-analysis element nodes lying on and inside that 2.5D-analysis element.

Alternatively, the interface element locator 632 may use a different type of element than those listed above.

In an embodiment in which the first portion of the solution domain comprises wedge elements, a set of line elements is created along the interface of the 2.5D-analysis portion and the 3D-analysis portion after the 2.5D-analysis portion is meshed with wedge elements by using nodes at the corners of each wedge plus one or more grid point nodes in between. The number of grid points used may be from about 3 to about 40. Generally, the number of grid points ranges from about 8 to about 20. Alternatively, fewer (0, 1, or 2) or more (over 40) grid points than indicated by these ranges is used.

The interface element locator 632 uses all of the nodes of the interface elements to make triangular elements to close the 3D-analysis portion (second portion) of the solution domain. At the open edges of the 2.5D-analysis portion (first portion), the grid points and nodes forming the wedges are discretized with a surface mesh to ensure that the first and second portions are connected. For example, in applying the above classification and discretization procedure to a planar, thin square plate, the region to be meshed with 2.5D-analysis wedges (first portion of the solution domain) is defined internal to all edges of the plate. The region between the wedges and the exterior edges of the plate are then meshed with 3D-analysis tetrahedral elements. This mesh allows accurate calculation of heat loss at the edge of the plate. However, for thin regions, the heat loss is minimal and may be ignored. Thus, in one example, the invention automatically places wedge elements at free edges of the model in order to lower the number of tetrahedral elements needed.

After the interface elements are located and the closing step above is performed, the second portion solution domain discretizer 636 in FIG. 6 discretizes the 3D-analysis portion with three-dimensional elements. The three-dimensional elements can be tetrahedral elements, hexahedral elements, or some combination of the two. However, any type or combination of polyhedral elements can be used.

In an alternate embodiment, the steps of discretizing the first and second portions of the solution domain and creating interface elements are ordered differently than described above. For example, components 628, 632, and 636 of the system of FIG. 6 may operate in a different order than shown in FIG. 6. For instance, the relative ordering of these three components of the system of FIG. 6 may be any of the following: (1) 628, 632, 636; (2) 628, 636, 632; (3) 632, 628, 636; (4) 632, 636, 628; (5) 636, 628, 632; and (6) 636, 632, 628.

Figure 17:
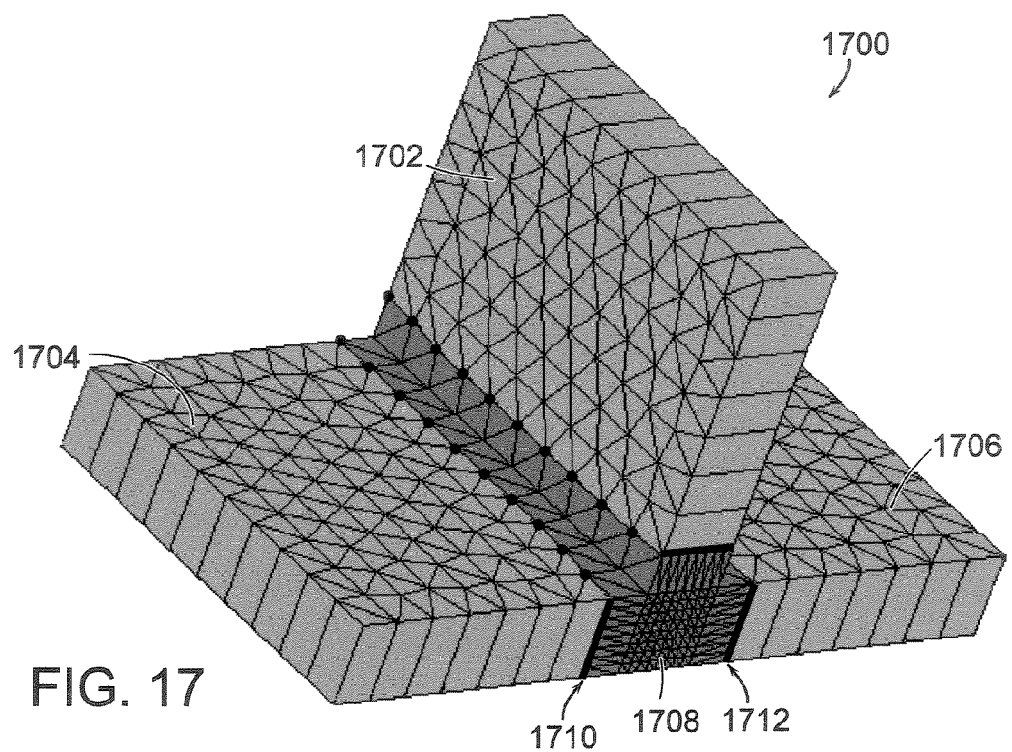
FIG. 17 depicts a hybrid mesh solution domain comprising two portions separated by interface elements, used in simulating fluid flow within a mold cavity according to an illustrative embodiment of the invention.
Figure 18:
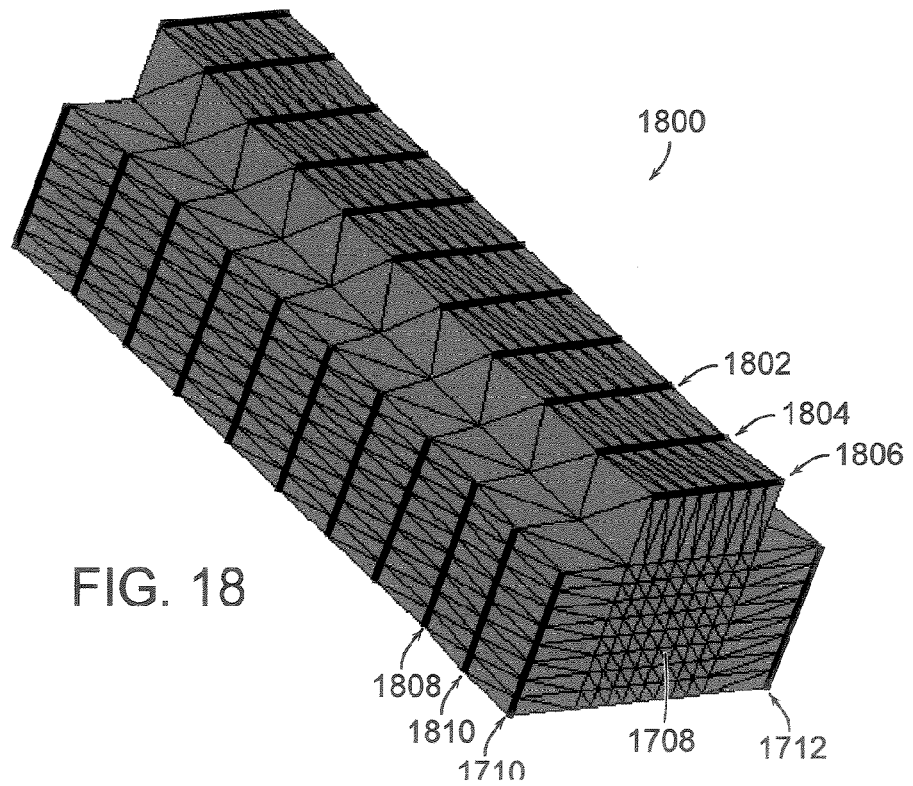
FIG. 18 depicts a portion of the hybrid mesh solution domain of FIG. 17 comprising tetrahedral elements and interface elements, used in simulating fluid flow within a mold cavity according to an illustrative embodiment of the invention.

FIG. 17 depicts an example of a hybrid mesh solution domain 1700 with a 2.5D-analysis portion and a 3D-analysis portion separated by interface elements, automatically created from CAD output according to an embodiment of the invention. The 2.5D-analysis portion is made up of regions 1702, 1704, 1706 (light colored) that are discretized with wedge elements. The wedge elements connect matched subsurfaces of the model. The 3D-analysis portion 1708 (darker colored) is discretized with tetrahedral elements. Linear interface elements lie along the boundary of the 2.5D-analysis and 3D-analysis portions and are shown as heavy line segments, such as those at 1710 and 1712. FIG. 18 depicts a close-up 1800 of the interface elements (for example, 1710, 1712, 1802, 1804, 1806, 1808, 1810) and tetrahedral elements (1708) of the hybrid solution domain in FIG. 17.

The equation solver 642 in the system 600 of FIG. 6 solves for the distribution of one or more process variables (such as pressure, temperature, flow velocity, stress, viscosity, and fluid flow front) in the first and second portions of the solution domain as functions of time. The governing equations include mass, momentum, and energy balances, and they are solved (concurrently) in the respective portions of the solution domain, subject to process inputs 640 that describe the process being modeled, initial conditions, and boundary conditions. Examples of solution procedures performed by the equation solver 642 are shown herein below for the 2.5D-analysis portion of the solution domain, the 3D-analysis portion of the solution domain, and the interface elements.

The 2.5D-analysis portion of the solution domain may be discretized using wedge elements that have or do not have grid points along their thicknesses. A low Reynolds number fluid flow is typical for fluid injection into narrow regions such as those that make up the 2.5D-analysis portion (first portion) of the solution domain. In one embodiment, a general Hele-Shaw approximation is used for process simulation with low Reynolds number flow in the 2.5D-analysis portion. The governing equations include momentum, energy, and mass (continuity) conservation equations, and are applied in the 2.5D-analysis portion of the solution domain. The governing equations for the 2.5D-analysis portion are shown in Equation 2 through Equation 4 as follows:

$$\frac{\partial P}{\partial x} = \frac{\partial}{\partial z}\left(\eta \frac{\partial v_x}{\partial z}\right) \quad (2)$$
$$\frac{\partial P}{\partial y} = \frac{\partial}{\partial z}\left(\eta \frac{\partial v_y}{\partial z}\right)$$
$$\frac{\partial P}{\partial z} = \frac{\partial}{\partial z}\left(\eta \frac{\partial v_z}{\partial z}\right)$$

$$\rho c_p\left(\frac{\partial T}{\partial t} + \vec{v} \cdot \nabla T\right) = \eta \dot{\gamma}^2 + \nabla \cdot (\lambda \nabla T) \quad (3)$$

$$\frac{\partial \rho}{\partial t} + \rho\left(\frac{\partial v_x}{\partial x} + \frac{\partial v_y}{\partial y} + \frac{\partial v_z}{\partial z}\right) = 0 \quad (4)$$

where Equation 2 represents the conservation of momentum equation in Cartesian coordinates (z is the thickness direction), Equation 3 represents the conservation of energy equation, and Equation 4 represents the continuity (conservation of mass) equation. In one embodiment, equations 2-4 are solved in each region of the 2.5D-analysis portion subject to the boundary conditions shown in Equations 5 and 6 as follows:

$$\vec{v}(z=\pm h)=0 \quad (5)$$

$$T(z=\pm h)=T_w \quad (6)$$

where $T_w$ is the mold wall temperature, and the mold walls are located at z=h and z=−h, where h is the halfwall thickness associated with the given region of the 2.5D-analysis portion. Heat conduction in the x- and y-directions may be ignored, and a slab formulation may be used to facilitate the calculation of temperature profile and viscosity profile (where viscosity may be a strong function of temperature). In an alternative embodiment, this simplification is not made. A finite difference method may be used for the solution of the energy balance in the 2.5D-analysis portion, where convection is based on an up-winding scheme. An example of an upwinding scheme is described in co-owned European Patent Number 1218163, issued Nov. 19, 2003, and U.S. patent application Ser. No. 09/404,932, the disclosures of which are incorporated herein by reference in their entirety.

By combining Equation 2 (momentum balance) and Equation 4 (continuity equation), the equation solver 642 in FIG. 6 derives finite element equations for the pressure field in the 2.5D-analysis portion of the solution domain using a Galerkin weighted residual approach. Equation 7 is obtained by expressing lumped mass on the right side of the equation:

$$S_e(A_e^T + A_e^B)\nabla N_i \nabla N_j p_i = S_e L_{ij} p_i = V_{n_j}^e \frac{\partial \rho_j}{\partial t} \quad (7)$$

where $S_e$ is the elemental flow conductance, defined as in Equation 8:

$$S_e = \int_0^h \frac{z^2}{\eta(z)} dz \quad (8)$$

and where $A_e^T$ is the top area of an element and $A_e^B$ is the bottom area of the element. In general, an asymmetric temperature profile results in an asymmetric viscosity profile. In this case, the flow conductance in a slab channel may be expressed as in Equation 9:

$$S_e = \frac{1}{2}\left\{\int_{h^-}^{h^+} \frac{z^2}{\eta(z)} dz - \frac{\left(\int_{h^-}^{h^+} \frac{z^2}{\eta(z)} dz\right)^2}{\int_{h^-}^{h^+} \frac{1}{\eta(z)} dz}\right\} \quad (9)$$

where integrals are evaluated from z=−h to z=h.

Thus, distributions of any of the following process variables throughout the 2.5D-analysis portion may be obtained as functions of time, for example: temperature, pressure, fluid velocity, fluid flow front position, internal energy, density, fluidity, viscosity, and gradients thereof.

In an alternative embodiment, the distribution of a process variable throughout the 2.5D-analysis portion of the solution domain is determined using the method of U.S. Pat. No. 6,096,088 to Yu et al., the disclosure of which is incorporated herein by reference in its entirety, so that flow fronts along matching subsurfaces are synchronized. In an embodiment employing this solution technique for the 2.5D-analysis portion of the solution domain, interface elements are planar in shape and lie between the 2.5D-analysis regions and the 3D-analysis regions.

The 3D-analysis portion of the solution domain is discretized with three-dimensional tetrahedral elements; however, other shapes may be used. The 3D analysis may include solution of Navier Stokes equations or the simplified Stokes equation, where inertia and gravity are ignored. Body forces such as inertia and gravity are generally negligible in injection molding where the fluid has a high viscosity and a low Reynolds number, but this simplification is not necessary.

The governing equations that are solved in the 3D-analysis portion include momentum, energy, and mass (continuity) conservation equations. In one embodiment, the generalized momentum equation is expressed as in Equation 10:

$$\rho \frac{\partial \vec{v}}{\partial t} = \rho \vec{g} - \nabla P + [\nabla \cdot \eta \dot{\gamma}] - \rho [\vec{v} \cdot \nabla \vec{v}] \quad (10)$$

Assuming negligible body forces, the momentum equations are expressed by the Stokes equation, Equation 11:

$$[\nabla \cdot \eta \dot{\gamma}] - \nabla P = 0 \quad (11)$$

In Cartesian coordinates, the Stokes equation is expressed as in Equation 12:

$$\frac{\partial P}{\partial x} = \frac{\partial}{\partial x}\left(2\eta \frac{\partial v_x}{\partial x}\right) + \frac{\partial}{\partial y}\left(\eta\left(\frac{\partial v_y}{\partial x} + \frac{\partial v_x}{\partial y}\right)\right) + \frac{\partial}{\partial z}\left(\eta\left(\frac{\partial v_z}{\partial x} + \frac{\partial v_x}{\partial z}\right)\right) \quad (12)$$

$$\frac{\partial P}{\partial y} = \frac{\partial}{\partial x}\left(\eta\left(\frac{\partial v_y}{\partial x} + \frac{\partial v_x}{\partial y}\right)\right) + \frac{\partial}{\partial y}\left(2\eta \frac{\partial v_y}{\partial y}\right) + \frac{\partial}{\partial z}\left(\eta\left(\frac{\partial v_z}{\partial y} + \frac{\partial v_y}{\partial z}\right)\right)$$

$$\frac{\partial P}{\partial z} = \frac{\partial}{\partial x}\left(\eta\left(\frac{\partial v_z}{\partial x} + \frac{\partial v_x}{\partial z}\right)\right) + \frac{\partial}{\partial y}\left(\eta\left(\frac{\partial v_y}{\partial z} + \frac{\partial v_z}{\partial y}\right)\right) + \frac{\partial}{\partial z}\left(2\eta \frac{\partial v_z}{\partial z}\right)$$

The continuity (mass conservation) equation in the 3D-analysis region is expressed as in Equation 13:

$$\frac{\partial \rho}{\partial t} + \vec{v} \cdot \nabla \rho + \rho \nabla \cdot \vec{v} = 0 \quad (13)$$

For modeling an injection molding process, the following boundary condition in Equation 14 may be applied:

$$\vec{v}(\vec{x}) = 0, \forall \vec{x} \in \partial \Omega \quad (14)$$

where $\partial \Omega$ is the mold/plastic interface. For linear tetrahedral elements in the 3D-analysis portion of the solution domain, the equation solver 642 uses element interpolation functions as the weighting functions. Applying the Bubnov-Galerkin approach then yields residual Equations 15-22:

$$R_x = \quad (15)$$
$$\frac{\partial}{\partial x}\left(2\eta \frac{\partial v_x}{\partial x}\right) + \frac{\partial}{\partial y}\left(\eta\left(\frac{\partial v_y}{\partial x} + \frac{\partial v_x}{\partial y}\right)\right) + \frac{\partial}{\partial z}\left(\eta\left(\frac{\partial v_z}{\partial x} + \frac{\partial v_x}{\partial z}\right)\right) - \frac{\partial P}{\partial x};$$

$$\langle R_x, N_i \rangle^e = \quad (16)$$
$$0 = \int_{V^e}\left[\left(2\eta \frac{\partial v_x}{\partial x} - P\right)\frac{\partial N_i}{\partial x} + \eta\left(\frac{\partial v_y}{\partial x} + \frac{\partial v_x}{\partial y}\right)\frac{\partial N_i}{\partial y} + \eta\left(\frac{\partial v_z}{\partial x} + \frac{\partial v_x}{\partial z}\right)\frac{\partial N_i}{\partial z}\right]dV - \int_{S^e}\bar{\sigma}_x N_i dS$$

$$R_y = \quad (17)$$
$$\frac{\partial}{\partial x}\left(\eta\left(\frac{\partial v_y}{\partial x} + \frac{\partial v_x}{\partial y}\right)\right) + \frac{\partial}{\partial y}\left(2\eta \frac{\partial v_y}{\partial y}\right) + \frac{\partial}{\partial z}\left(\eta\left(\frac{\partial v_z}{\partial y} + \frac{\partial v_y}{\partial z}\right)\right) - \frac{\partial P}{\partial y};$$

$$\langle R_y, N_i \rangle^e = \quad (18)$$
$$0 = \int_{V^e}\left[\eta\left(\frac{\partial v_y}{\partial x} + \frac{\partial v_x}{\partial y}\right)\frac{\partial N_i}{\partial x} + \left(2\eta \frac{\partial v_y}{\partial y} - P\right)\frac{\partial N_i}{\partial y} + \eta\left(\frac{\partial v_z}{\partial y} + \frac{\partial v_y}{\partial z}\right)\frac{\partial N_i}{\partial z}\right]dV - \int_{S^e}\bar{\sigma}_y N_i dS$$

$$R_z = \frac{\partial}{\partial x}\left(\eta\left(\frac{\partial v_z}{\partial x} + \frac{\partial v_x}{\partial z}\right)\right) + \frac{\partial}{\partial y}\left(\eta\left(\frac{\partial v_y}{\partial z} + \frac{\partial v_z}{\partial y}\right)\right) + \frac{\partial}{\partial z}\left(2\eta \frac{\partial v_z}{\partial z}\right) - \frac{\partial P}{\partial z}; \quad (19)$$

$$\langle R_z, N_i \rangle^e = \quad (20)$$
$$0 = \int_{V^e}\left[\eta\left(\frac{\partial v_z}{\partial x} + \frac{\partial v_x}{\partial z}\right)\frac{\partial N_i}{\partial x} + \eta\left(\frac{\partial v_z}{\partial y} + \frac{\partial v_y}{\partial z}\right)\frac{\partial N_i}{\partial y} + \left(2\eta \frac{\partial v_z}{\partial z} - P\right)\frac{\partial N_i}{\partial z}\right]dV - \int_{S^e}\bar{\sigma}_z N_i dS$$

$$R_P = \frac{\partial \rho}{\partial t} + \vec{v} \cdot \nabla \rho + \rho \nabla \cdot \vec{v}; \quad (21)$$

$$\langle R_P, N_i \rangle^e = 0 = \int_{V^e}\left(\frac{\partial \rho}{\partial t} + \vec{v} \cdot \nabla \rho + \rho \nabla \cdot \vec{v}\right)N_i dv \quad (22)$$

Using linear interpolation functions to approximate both velocities and pressure in the tetrahedral element, the elemental stiffness matrix in Equation 23 results:

$$\begin{bmatrix} 2\bar{\bar{k}}_{11} + \bar{\bar{k}}_{22} + \bar{\bar{k}}_{33} & \bar{\bar{k}}_{12} & \bar{\bar{k}}_{13} & \bar{\bar{L}}_1 \\ \bar{\bar{k}}_{21} & \bar{\bar{k}}_{11} + 2\bar{\bar{k}}_{22} + \bar{\bar{k}}_{33} & \bar{\bar{k}}_{23} & \bar{\bar{L}}_2 \\ \bar{\bar{k}}_{31} & \bar{\bar{k}}_{32} & \bar{\bar{k}}_{11} + \bar{\bar{k}}_{22} + 2\bar{\bar{k}}_{33} & \bar{\bar{L}}_3 \\ \bar{\bar{L}}_1^T & \bar{\bar{L}}_2^T & \bar{\bar{L}}_3^T & 0 \end{bmatrix} \begin{Bmatrix} \bar{v}_x \\ \bar{v}_y \\ \bar{v}_z \\ \bar{P} \end{Bmatrix} = \begin{Bmatrix} \bar{R}_{v_x} \\ \bar{R}_{v_y} \\ \bar{R}_{v_z} \\ 0 \end{Bmatrix} \quad (23)$$

or $\begin{bmatrix} \bar{\bar{K}} & \bar{\bar{L}} \\ \bar{\bar{L}}^T & 0 \end{bmatrix} \begin{Bmatrix} \bar{\bar{v}} \\ \bar{\bar{P}} \end{Bmatrix} = \begin{Bmatrix} \bar{\bar{R}} \\ 0 \end{Bmatrix}$ for short.

$$(\bar{\bar{k}}_{ij})_{kl} = \int_{V^e} \eta \frac{\partial N_k}{\partial x_i} \frac{\partial N_l}{\partial x_j} dV,$$

$$(\bar{\bar{L}}_i)_{kl} = -\int_{V^e} \frac{\partial N_k}{\partial x_i} N_l dV = -\frac{\partial N_k}{\partial x_i} \frac{V^e}{4},$$

Without modification, this system may be ill-posed, since it does not satisfy the "inf-sup" or Babuska-Brezzi stability condition. Spurious pressure modes may cause severe oscillation in the pressure solution, and the velocity solution may lock, regardless of mesh size. Therefore, the Equation solver uses a "Mini" element formulation to stabilize the system. In the Mini element formulation, an enriched space of velocity trial functions is constructed out of the linear trial space and the space of bubble functions as in Equation 24:

$$\vec{v}_+ = \vec{v}_1 + \vec{v}_b \quad (24)$$

where $\vec{v}_1$ is the usual linear interpolation in the element and $\vec{v}_b$ is the bubble velocity in the element. The bubble velocity is expressed in terms of a bubble shape function, $\phi(\vec{x})$, as in Equation 25:

$$\vec{v}_b = \phi(\vec{x})\vec{v}_b^e \qquad (25)$$

$$\begin{cases} \phi(\vec{x}) > 0 & \forall \vec{x} \in e \setminus \partial e \\ \phi(\vec{x}) = 0 & \forall \vec{x} \in \partial e \\ \phi(\vec{x}) = 1 & \vec{x} = \text{geometrical centre of } e \end{cases}$$

The quantity $\vec{v}_b^e$ is an element vector such that $\vec{v}_b$ has constant direction in an element but a varying magnitude determined by the bubble shape function, $\phi(\vec{x})$. A cubic bubble shape function, which is actually quartic in three-dimensions, is one option, shown as in Equation 26:

$$\phi(\vec{x}) = 1^4 N_1(\vec{x}) N_2(\vec{x}) N_3(\vec{x}) N_4(\vec{x}), \qquad (26)$$

A quadratic bubble shape function may be used for greater stability, as in Equation 27:

$$\phi(\vec{x}) = 2 - 4\sum_k (N_k(\vec{x}))^2, \forall \vec{x} \in e \qquad (27)$$

Since the linear subspace and the bubble subspace are orthogonal, Equation 28 applies:

$$\int \nabla \vec{v}_1 : \nabla \vec{v}_b dV = 0, \qquad (28)$$

where $V^e$ is element volume. Substituting Equations 24 through 28 into Equation 23 produces a linear system of equations with the structure shown in Equation 29:

$$\begin{bmatrix} \overline{\overline{K}} & \overline{\overline{0}} & \overline{\overline{L}} \\ \overline{\overline{0}} & \overline{\overline{K_b}} & \overline{\overline{L_b}} \\ \overline{\overline{L}}^T & \overline{\overline{L_b}} & \overline{\overline{0}} \end{bmatrix} \begin{Bmatrix} \overline{v}_l \\ \overline{v}_b \\ \overline{P} \end{Bmatrix} = \begin{Bmatrix} \overline{R} \\ \overline{R}_b \\ \overline{0} \end{Bmatrix} \qquad (29)$$

$$\overline{\overline{K_b}} = \begin{bmatrix} 2k_{11}^b + k_{22}^b + k_{33}^b & k_{12}^b & k_{13}^b \\ k_{21}^b & k_{11}^b + 2k_{22}^b + k_{33}^b & k_{23}^b \\ k_{31}^b & k_{32}^b & k_{11}^b + k_{22}^b + 2k_{33}^b \end{bmatrix}$$

where, for a quadratic bubble function, Equations 30 and 31 apply:

$$k_{ij}^b = \int_{V^e} \eta \frac{\partial \phi}{\partial x_i} \frac{\partial \phi}{\partial x_j} dV = \frac{16}{5} V^e \eta^e \sum_{k=1}^{4} \sum_{l=k}^{4} \frac{\partial N_k}{\partial x_i} \frac{\partial N_l}{\partial x_j}, \qquad (30)$$

$$(\overline{\overline{L_b}})_{ij} = \int_{V^e} \frac{\partial \phi}{\partial x_i} N_j dV = 1.6 V^e \sum_{m=1}^{4} (2 - \delta_{fm}) \frac{\partial N_m}{\partial x_i}, \qquad (31)$$

and, for a cubic bubble function, the following applies:

$$k_{ij}^b = \int_{V^e} \eta \frac{\partial \phi}{\partial x_i} \frac{\partial \phi}{\partial x_j} dV = \frac{4096}{945} V^e \eta^e \sum_{k=1}^{4} \sum_{l=k}^{4} \frac{\partial N_k}{\partial x_i} \frac{\partial N_l}{\partial x_j}, \qquad (32)$$

$$(\overline{\overline{L_b}})_{ij} = \int_{V^e} \frac{\partial \phi}{\partial x_i} N_j dV = \frac{32 V^e}{105} \sum_{m=1}^{4} (2 - \delta_{fm}) \frac{\partial N_m}{\partial x_i}. \qquad (33)$$

Since the bubble velocities in this embodiment are only defined inside the element under consideration, the system in Equation 29 is reduced by static condensation of the bubble velocities to produce Equation 34:

$$\begin{bmatrix} \overline{\overline{K}} & \overline{\overline{L}} \\ \overline{\overline{L}}^T & -\overline{\overline{L_b}}^T \overline{\overline{K_b}}^{-1} \overline{\overline{L_b}} \end{bmatrix} \begin{Bmatrix} \overline{\overline{u}} \\ \overline{P} \end{Bmatrix} = \begin{Bmatrix} \overline{\overline{R}} \\ -\overline{\overline{L_b}}^T \overline{\overline{K_b}}^{-1} \overline{R_b} \end{Bmatrix} \qquad (34)$$

Having solved for the linear part of the velocity, $\vec{v}_1$, the actual velocity, $\vec{v}_+$, is obtained from Equation 24. For a cubic bubble, the bubble velocity is zero at nodes such that the nodal values of $\vec{v}_1$ are, in fact, the desired solution. For a quadratic bubble, the bubble velocity at each node within an element, according to Equation 27, is $-2\vec{v}_b^e$. In one embodiment, this term is considered to be negligible.

Alternatively, the equation solver 642 of FIG. 6 solves for the distribution of process variables in the 3D-analysis portion of the solution domain using a boundary element method (BEM). Here, the boundary element method only requires an external mesh and there is no need to mesh the interior of the 3D-analysis portion of the solution. A boundary element method may be applied for simple fluids and/or for linear structural analysis. The equation solver 642 may solve a nonlinear problem with an extended BEM or a meshless technique by inserting points within the 3D-analysis portion.

The equation solver 642 in FIG. 6 can solve for the temperature field in the 3D-analysis portion of the solution domain. The generalized energy conservation equation that is solved in the 3D-analysis portion is shown in Equation 35:

$$\rho c_p \left( \frac{\partial T}{\partial t} + \overline{v} \cdot \nabla T \right) = \beta T \left( \frac{\partial P}{\partial t} + \overline{v} \cdot \nabla P \right) + \eta \dot{\gamma}^2 + \nabla \cdot (\lambda \nabla T) + \dot{Q} \qquad (35)$$

Equation 35 accounts for the variation of temperature in a mold as a function of position and time, due to convection, compressive heating, viscous dissipation, heat conduction to/from the mold, and/or heat sources such as heat of reaction and/or other heat source effects. The energy conservation equation is generally solved concurrently with the mass and momentum conservation equations. Equation 35 may be solved using one or more finite element techniques, finite different techniques, or a combination of finite difference and finite element techniques.

In one example, the equation solver 642 solves the energy balance of Equation 35 for the 3D-analysis portion of the solution domain using a finite element method. Shear heating and compressive heating may be explicitly calculated based on the results of the preceding time step. Convection may be calculated based on an up-winding method and temperature interpolation. Heat capacity can be lumped or consistent. An example of an up-winding method and temperature interpolation method is described in co-owned European Patent No. 1218163, issued Nov. 19, 2003, and U.S. patent application Ser. No. 09/404,932, the disclosures of which are incorporated herein by reference in their entirety.

Thus, distributions of any of the following process variables throughout the 3D-analysis portion may be obtained as functions of time, for example: temperature, pressure, fluid velocity, fluid flow front position, internal energy, density, fluidity, viscosity, and gradients thereof.

An energy balance is generally not solved for the interface elements; however, their connectivity information may be used for the heat convection calculation when heat is convected between a 2.5D-analysis region and a 3D-analysis region.

The interface elements can bridge up the geometry and/or degrees-of-freedom discontinuities on the boundaries between regions of the solution domain. For example, the equation solver 642 in FIG. 6 may treat the interface elements as general finite elements, where an elemental matrix for an interface element is described as in Equation 36:

$$k_{ij}^e = P^* f(n_i^e, n_j^e) \quad (36)$$

where P* is the "penalty number." In one example, the equation solver 642 uses a penalty method to formulate the elemental matrix to enforce continuity. Here, P* in Equation 36 is a large number and $f(n_i^e, n_j^e)$ is a function of node i and node j of the given element. The elemental matrix of interface elements for the pressure field may be expressed as in Equation 37:

$$K_{ij} = \begin{cases} -P \cdot f_j^T \cdot \sigma_{N_j} \cdot V_{N_j} & i = N_T, i \neq j \\ 0 & i \neq j, \; i, j \notin N_T, N_B \\ P \cdot \sigma_{N_j} \cdot V_{N_j} & i = j, \; i, j \notin N_T, N_B \\ -P \cdot f_j^B \cdot \sigma_{N_j} \cdot V_{N_j} & i = N_B, \; i \neq j \\ P \cdot \sum f_j^T \cdot \sigma_{N_j} \cdot V_{N_j} & i = j = N_T \\ P \cdot \sum f_j^B \cdot \sigma_{N_j} \cdot V_{N_j} & i = j = N_B \end{cases} \quad (37)$$

$$f_i^T = (z_{N_i} - h)/2h, \qquad f_i^B = 1.0 - f_i^T$$

$$\sigma_{N_i} = \frac{\int_{h^-}^{h^+} \frac{z'}{\eta(z')} dz'}{\int_{h^-}^{h^+} \frac{1}{\eta(z')} dz'} \int_{h^-}^{L_{N_1}} \frac{1}{\eta(z')} dz' - \int_{h^-}^{L_{N_1}} \frac{z'}{\eta(z')} dz'$$

where $N_T$ represents the top node and $N_B$ represents the bottom node of the interface element, and where h is the half-height of the interface element.

FIGS. 19-23 demonstrate the simulation of fluid flow within an example mold cavity. The simulation includes automatically creating a hybrid solution domain for the mold cavity using CAD output, automatically discretizing the domain, and solving for the distribution of process variables within the solution domain.

FIG. 19 depicts an injection-molded, plastic component 1900 for an automobile dashboard. In order to manufacture the plastic component 1900, it is desired to create a model of the component for performing a simulation of flow within the mold during injection molding. The process simulation allows, for example, adjustment of process conditions, injection point placement, identification of potential processing trouble spots, and/or adjustment of the component design at any stage of the design and/or manufacturing process, without (or with a minimum of) experimental trial-and-error.

FIG. 20 is a graphical representation 2000 of STL-formatted CAD output produced during the design of the plastic component 1900 of FIG. 19. The mesh 2000 in FIG. 20 is not yet adapted for use in finite element analysis. The system 600 depicted in FIG. 6 uses the CAD output 602 to automatically create a hybrid solution domain comprising a 2.5D-analysis portion and a 3D-analysis portion, which is then used in finite element analysis. These steps are described in more detail herein above.

Figure 21:
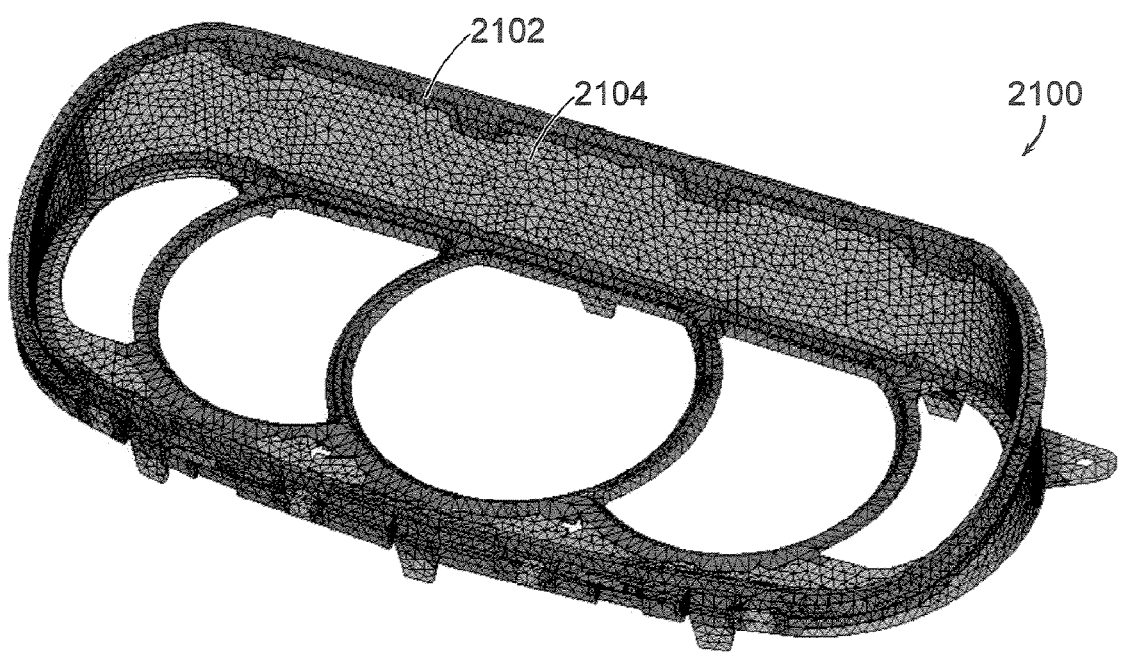
FIG. 21 depicts a hybrid mesh solution domain used to simulate injection molding of the component in FIG. 19, where one portion of the domain is discretized using wedge elements for 2.5D analysis or dual domain analysis, and another portion of the domain is discretized using tetrahedral elements for 3D analysis, according to an illustrative embodiment of the invention.

FIG. 21 depicts the hybrid mesh solution domain 2100 for the component 1900 as automatically determined using the system 600 of FIG. 6. The hybrid mesh solution domain 2100 has two portions—the light-colored portion 2104 is discretized using 6-node wedge elements, and the dark-colored portion 2102 is discretized using tetrahedral elements. A 2.5D flow analysis will be performed in the light-colored portion 2104, and a 3D flow analysis will be concurrently performed in the dark-colored portion 2102.

Figure 22:
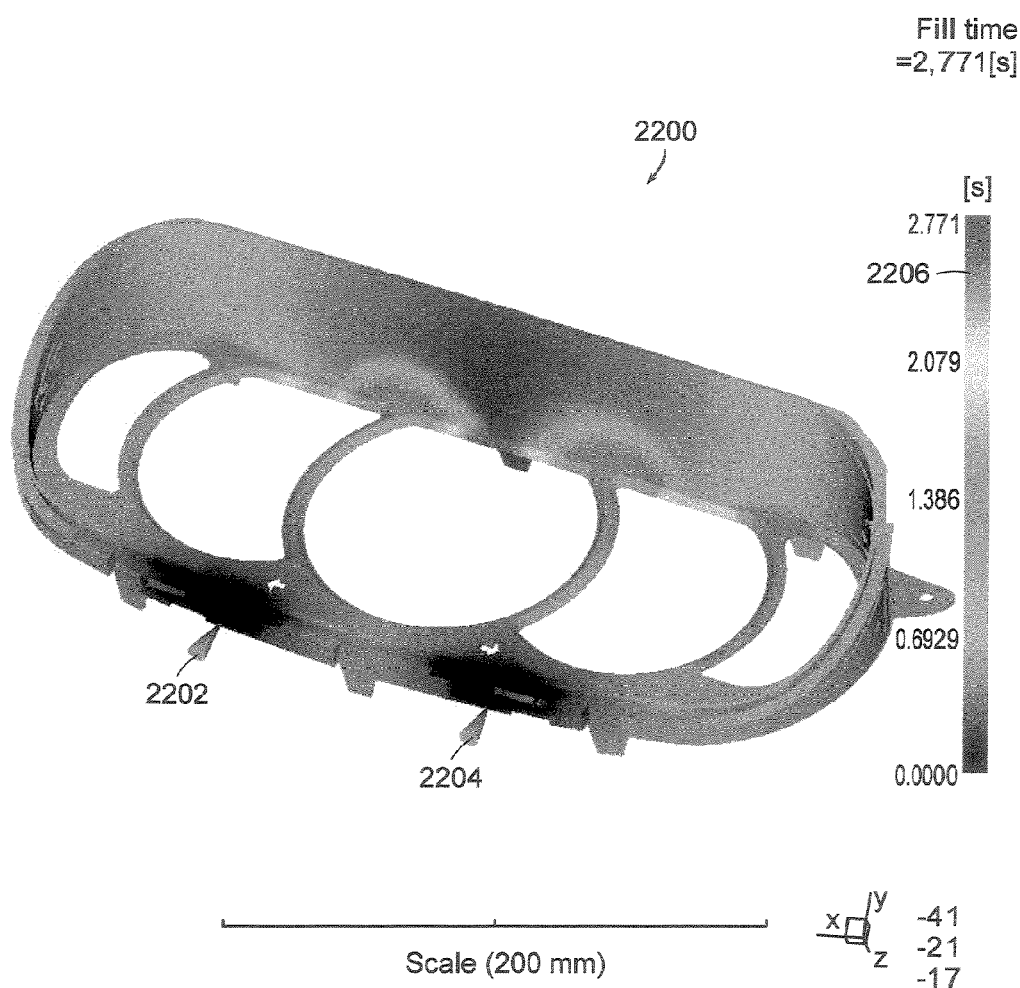
FIG. 22 depicts a map of times at which the flow front reaches points within the mold of the component of FIG. 19, obtained using the hybrid solution domain of FIG. 21 and a combined 2.5D/3D flow analysis approach, according to an illustrative embodiment of the invention.

The flow analysis is performed, for example, by the equation solver component 642 of the system 600 of FIG. 6, as described in more detail above. The solver 642 determines the distribution of process variables throughout the solution domain. For example, FIG. 22 depicts a map 2200 of times at which the flow front reaches points within the mold of the component 1900 of FIG. 19, given the location of the two injection points 2202 and 2204. The location of the two injection points 2202 and 2204 are two of the process inputs 640 used by the equation solver 642 in the system 600 of FIG. 6. In the example shown in FIG. 22, the time required to completely fill the mold for the component 1900 is 2.771 seconds. According to the index at reference 2206, the red-colored portions are the last portions of the mold to be filled.

Figure 23:
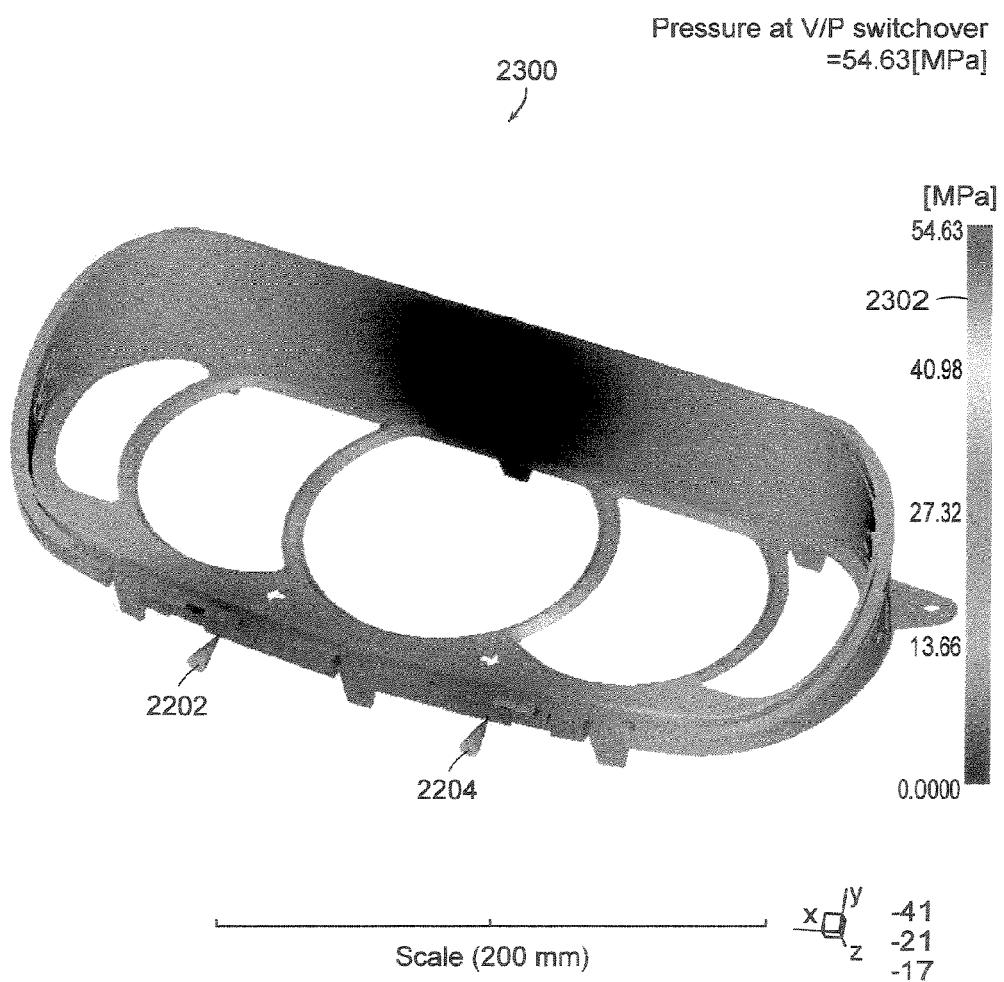
FIG. 23 depicts the pressure distribution at the filling/packing switchover point, obtained using the hybrid mesh solution domain of FIG. 21 and a combined 2.5D/3D flow analysis approach, according to an illustrative embodiment of the invention.

FIG. 23 depicts the pressure distribution at the filling/packing switchover point in the injection molding of the component 1900 of FIG. 19. Pressure distribution is another of the process variables determined using the hybrid mesh solution domain 2100 of FIG. 21 and the combined 2.5D/3D flow analysis approach described herein. Other process variables that may be determined include, for example, temperature distribution, fluid velocity, viscosity, fluid flow front position, internal energy, density, fluidity, and gradients thereof, all of which may be expressed as functions of time.

Figure 24:
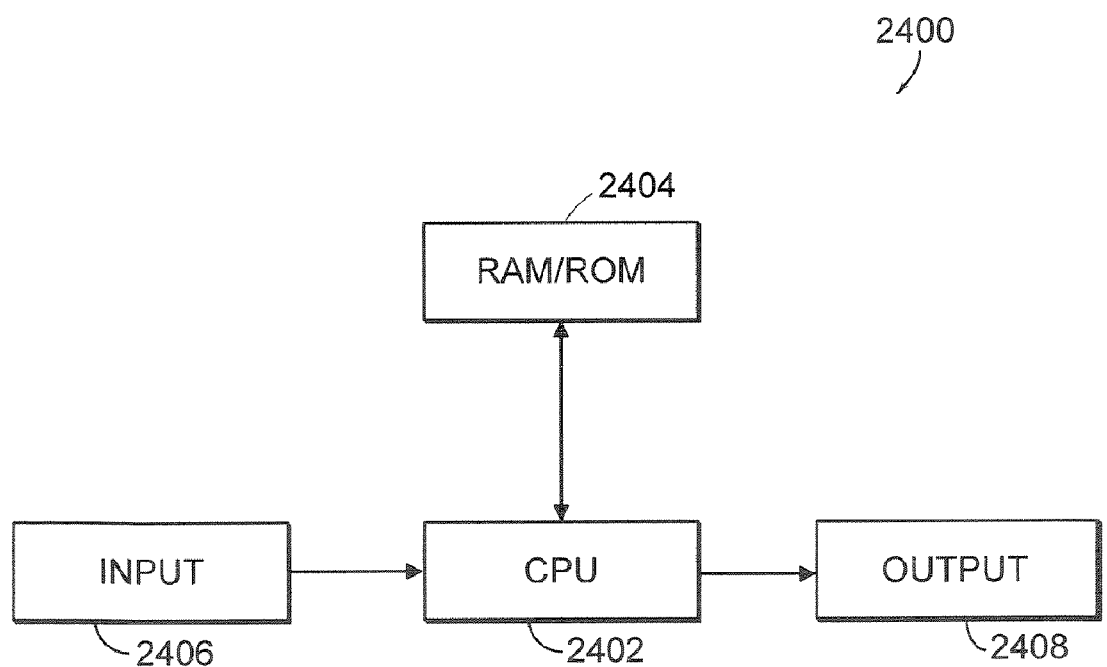
FIG. 24 depicts a computer hardware apparatus suitable for use in carrying out the methods described herein, according to an illustrative embodiment of the invention.

FIG. 24 depicts a computer hardware apparatus 2400 suitable for use in carrying out any of the methods described herein. The apparatus 2400 may be a portable computer, a desktop computer, a mainframe, or other suitable computer having the necessary computational speed and accuracy to support the functionality discussed herein. The computer 2400 typically includes one or more central processing units 2402 for executing the instructions contained in the software code which embraces one or more of the methods described herein. Storage 2404, such as random access memory and/or read-only memory, is provided for retaining the code, either temporarily or permanently, as well as other operating software required by the computer 2400. Permanent, non-volatile read/write memory such as hard disks are typically used to store the code, both during its use and idle time, and to store data generated by the software. The software may include one or more modules recorded on machine-readable media such as magnetic disks, magnetic tape, CD-ROM, and semiconductor memory, for example. Preferably, the machine-readable medium is resident within the computer 2400. In alternative embodiments, the machine-readable medium can be connected to the computer 2400 by a communication link. For example, a user of the software may provide input data via the internet, which is processed remotely by the computer 2400, and then simulation output is sent to the user. In alternative embodiments, one can substitute computer instructions in the form of hardwired logic for software, or one can substitute firmware (i.e., computer instructions recorded on devices such as PROMs, EPROMs, EEPROMs, or the like) for software. The term machine-readable instructions as used herein is intended to encompass software, hardwired logic, firmware, object code, and the like.

The computer 2400 is preferably a general purpose computer. The computer 2400 can be, for example, an embedded computer, a personal computer such as a laptop or desktop computer, a server, or another type of computer that is capable of running the software, issuing suitable control commands, and recording information. The computer 2400 includes one or more input devices 2406, such as a keyboard and disk reader for receiving input such as data and instructions from a user, and one or more output devices 2408, such as a monitor or printer for providing simulation results in graphical and other formats. Additionally, communication buses and I/O ports may be provided to link all of the components together and permit communication with other computers and computer networks, as desired.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A system comprising one or more processors configured to execute one or more executable modules including:
   a preprocessor configured to determine a surface mesh of a component to be manufactured based on a geometric description of the component, wherein the surface mesh comprises a plurality of triangular surface elements;
   a surface element analyzer configured to determine one or more element properties of each surface element in the plurality of surface elements and to determine one or more nodal properties of each surface element in the plurality of surface elements;
   a feature edge locator configured to locate one or more feature edges of the surface mesh using the element properties of a plurality of the surface elements;
   a subsurface classifier configured to assign each surface element in the plurality of surface elements to one of a plurality of subsurfaces according to a bending curvature of the surface element, wherein the subsurface classifier is configured to identify one or more subsurface properties and any surface loops for each subsurface of the plurality of subsurfaces;
   a remesher configured to coarsen or refine a mesh of one of the subsurfaces according to a specified edge length;
   a subsurface matcher configured to determine a first plurality of the surface elements that define a 2.5D-analysis portion of a hybrid mesh solution domain and a different second plurality of the surface elements that define a 3D-analysis portion of the hybrid mesh solution domain, wherein the subsurface matcher is configured to categorize each subsurface into one or more categories including a matched category, an unmatched category, and an edge category, and wherein the subsurface matcher is configured to assign a respective thickness to at least the subsurfaces categorized into the matched category;
   a first solution domain discretizer configured to define one or more wedge elements using the first plurality of the surface elements and to discretize the 2.5D-analysis portion;
   an interface element locator configured to define one or more interface elements along a boundary between the 2.5D-analysis portion and the 3D-analysis portion;
   a second solution domain discretizer configured to define one or more tetrahedral elements using the second plurality of the surface elements and to discretize the 3D-analysis portion; and
   an equation solver configured to determine a solution for a distribution of one or more process variables throughout the hybrid mesh solution domain, wherein the solution for each process variable is given as a function of time.

2. The system of claim 1, wherein the surface element analyzer is further configured to determine a bending angle between two adjacent elements.

3. The system of claim 1, wherein the surface element analyzer is further configured to determine a bending curvature between two adjacent elements.

4. The system of claim 1, wherein the feature edge locator is further configured to locate the feature edges at one or more of the following locations: a location where the bending angle between two adjacent elements is greater than a feature edge threshold, a location at an edge between a planar element and a curved element, and a location where there is a change in bending curvature direction.

5. The system of claim 1, wherein the subsurface matcher is further configured to use a collapse procedure to categorize at least a first subsurface into the edge category.

6. The system of claim 1, wherein the interface element location is further configured to close the 3D-analysis portion of the hybrid mesh solution domain.

7. A method performed by one or more processors, the method comprising:
   determining a surface mesh of a component to be manufactured based on a geometric description of the component, wherein the surface mesh comprises a plurality of triangular surface elements;
   determining one or more element properties of each surface element in the plurality of surface elements and determining one or more nodal properties of each surface element in the plurality of surface elements;
   locating one or more feature edges of the surface mesh using the element properties of a plurality of the surface elements;
   assigning each surface element in the plurality of surface elements to one of a plurality of subsurfaces according to a bending curvature of the surface element and identifying one or more subsurface properties and any surface loops for each subsurface of the plurality of subsurfaces;
   coarsening or refining a mesh of one of the subsurfaces according to a specified edge length;
   determining a first plurality of the surface elements that define a 2.5D-analysis portion of a hybrid mesh solution domain and a different second plurality of the surface elements that define a 3D-analysis portion of the hybrid mesh solution domain and categorizing each subsurface into one or more categories including a matched category, an unmatched category, and an edge category and assigning a respective thickness to at least the subsurfaces categorized into the matched category;
   defining one or more wedge elements using the first plurality of the surface elements and discretizing the 2.5D-analysis portion;
   defining one or more interface elements along a boundary between the 2.5D-analysis portion and the 3D-analysis portion;
   defining one or more tetrahedral elements using the second plurality of the surface elements and discretizing the 3D-analysis portion; and
   determining a solution for a distribution of one or more process variables throughout the hybrid mesh solution domain, wherein the solution for each process variable is given as a function of time.

8. The method of claim 7, further comprising determining a bending angle between two adjacent elements.

9. The method of claim 7, further comprising determining a bending curvature between two adjacent elements.

10. The method of claim 7, further comprising locating the feature edges at one or more of the following locations: a location where the bending angle between two adjacent elements is greater than a feature edge threshold, a location at an edge between a planar element and a curved element, and a location where there is a change in bending curvature direction.

11. The method of claim 7, further comprising using a collapse procedure to categorize at least a first subsurface into the edge category.

12. The method of claim 7, further comprising closing the 3D-analysis portion of the hybrid mesh solution domain.

13. A machine-readable medium encoded with a computer program, the program comprising instructions that when executed by one or more processors cause the processors to perform operations comprising:
- determining a surface mesh of a component to be manufactured based on a geometric description of the component, wherein the surface mesh comprises a plurality of triangular surface elements;
- determining one or more element properties of each surface element in the plurality of surface elements and determining one or more nodal properties of each surface element in the plurality of surface elements;
- locating one or more feature edges of the surface mesh using the element properties of a plurality of the surface elements;
- assigning each surface element in the plurality of surface elements to one of a plurality of subsurfaces according to a bending curvature of the surface element and identifying one or more subsurface properties and any surface loops for each subsurface of the plurality of subsurfaces;
- coarsening or refining a mesh of one of the subsurfaces according to a specified edge length;
- determining a first plurality of the surface elements that define a 2.5D-analysis portion of a hybrid mesh solution domain and a different second plurality of the surface elements that define a 3D-analysis portion of the hybrid mesh solution domain and categorizing each subsurface into one or more categories including a matched category, an unmatched category, and an edge category and assigning a respective thickness to at least the subsurfaces categorized into the matched category;
- defining one or more wedge elements using the first plurality of the surface elements and discretizing the 2.5D-analysis portion;
- definining one or more interface elements along a boundary between the 2.5D-analysis portion and the 3D-analysis portion;
- defining one or more tetrahedral elements using the second plurality of the surface elements and discretizing the 3D-analysis portion; and
- determining a solution for a distribution of one or more process variables throughout the hybrid mesh solution domain, wherein the solution for each process variable is given as a function of time.

14. The machine-readable medium of claim 13, the operations further comprising determining a bending angle between two adjacent elements.

15. The machine-readable medium of claim 13, the operations further comprising determining a bending curvature between two adjacent elements.

16. The machine-readable medium of claim 13, the operations further comprising locating the feature edges at one or more of the following locations: a location where the bending angle between two adjacent elements is greater than a feature edge threshold, a location at an edge between a planar element and a curved element, and a location where there is a change in bending curvature direction.

17. The machine-readable medium of claim 13, the operations further comprising using a collapse procedure to categorize at least a first subsurface into the edge category.

18. The machine-readable medium of claim 13, the operations further comprising closing the 3D-analysis portion of the hybrid mesh solution domain.

* * * * *

UNITED STATES PATENT AND TRADEMARK OFFICE
CERTIFICATE OF CORRECTION

PATENT NO. : 7,979,257 B2  Page 1 of 1
APPLICATION NO. : 11/961916
DATED : July 12, 2011
INVENTOR(S) : Huagang Yu and Peter Kennedy It is certified that error appears in the above-identified patent and that said Letters Patent is hereby corrected as shown below:

Column 30, line 54, delete "definining" and insert -- defining --

Column 32, line 9, delete "definining" and insert -- defining --

Signed and Sealed this
Twentieth Day of September, 2011

David J. Kappos
*Director of the United States Patent and Trademark Office*